US011687700B1

(12) United States Patent
Pfitzmann et al.

(10) Patent No.: US 11,687,700 B1
(45) Date of Patent: Jun. 27, 2023

(54) GENERATING A STRUCTURE OF A PDF-DOCUMENT

(71) Applicant: INTERNATIONAL BUSINESS MACHINES CORPORATION, Armonk, NY (US)

(72) Inventors: Birgit Monika Pfitzmann, Wettswil (CH); Christoph Auer, Zürich (CH); Michele Dolfi, Zurich (CH); Peter Willem Jan Staar, Zurich (CH); Ahmed Samy Nassar, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/649,597

(22) Filed: Feb. 1, 2022

(51) Int. Cl.
*G06F 40/00* (2020.01)
*G06F 40/103* (2020.01)
(Continued)

(52) U.S. Cl.
CPC ............ *G06F 40/103* (2020.01); *G06N 3/08* (2013.01); *G06V 30/412* (2022.01); *G06V 30/414* (2022.01)

(58) Field of Classification Search
CPC .. G06F 40/103; G06V 30/412; G06V 30/414; G06N 3/08
See application file for complete search history.

(56) References Cited

U.S. PATENT DOCUMENTS

| 6,661,919 B2 * | 12/2003 | Nicholson | .............. | G06V 30/40 |
| | | | | 382/173 |
| 8,645,819 B2 * | 2/2014 | Dejean | .................. | G06F 40/103 |
| | | | | 715/243 |

(Continued)

FOREIGN PATENT DOCUMENTS

| CN | 102317933 B * 11/2016 | .............. G06F 16/93 |
| EP | 1739574 A1 * 1/2007 | ......... G06K 9/00463 |

(Continued)

OTHER PUBLICATIONS

Deoras, "What is Neuro-Symbolic AI and Why Are Researchers Gushing Over It", Analytics India Magazine, Published May 10, 2020, 9 Pages. https://analyticsindiamag.com/what-is-neuro-symbolic-ai-and-why-are-researchers-gushing-over-it/.

(Continued)

*Primary Examiner* — Shahid K Khan
(74) *Attorney, Agent, or Firm* — Robert R. Aragona

(57) ABSTRACT

The present disclosure relates to a method for generating a structure of a PDF-document, wherein the PDF-document comprises elements. The method comprises detecting document cells of the PDF-document dependent on commands of a page description language for printing the elements of the PDF-document. The method comprises determining parts of the PDF-document dependent on the PDF-document by a machine learning module. The determining of the respective part comprises associating a respective portion of the elements of the PDF-document with the respective part. Furthermore, a respective label may be assigned to the respec- (Continued)

tive part. The method may further comprise using a symbolic artificial intelligence module, wherein rules of the symbolic AI-module for reconciling the document cells with the parts may be applied. The elements of the structure of the PDF-document may be generated and labelled dependent on a result of the reconciling and dependent on the respective label to the respective part.

19 Claims, 13 Drawing Sheets

(51) Int. Cl.
*G06N 3/08* (2023.01)
*G06V 30/412* (2022.01)
*G06V 30/414* (2022.01)

(56) References Cited

U.S. PATENT DOCUMENTS

| | | | | |
|---|---|---|---|---|
| 9,953,008 | B2* | 4/2018 | Zaric | G06F 40/103 |
| 10,095,677 | B1* | 10/2018 | Manohar | G06V 30/412 |
| 10,606,933 | B2* | 3/2020 | Breuel | G06F 40/131 |
| 2002/0029232 | A1* | 3/2002 | Bobrow | G06V 30/418 |
| | | | | 514/534 |
| 2010/0040287 | A1* | 2/2010 | Jain | G06V 30/414 |
| | | | | 382/177 |
| 2011/0255794 | A1* | 10/2011 | Neogi | G06V 30/262 |
| | | | | 382/203 |
| 2016/0092406 | A1* | 3/2016 | Farouki | G06F 18/285 |
| | | | | 715/249 |
| 2017/0109329 | A1* | 4/2017 | Wyatt | G06T 11/60 |
| 2019/0050381 | A1* | 2/2019 | Agrawal | G06V 30/414 |
| 2019/0156115 | A1* | 5/2019 | Cohen | G06N 3/08 |
| 2019/0188466 | A1* | 6/2019 | Marr | G06V 30/413 |
| 2019/0303412 | A1* | 10/2019 | Ray | G06F 40/169 |
| 2019/0354818 | A1* | 11/2019 | Reisswig | G06N 3/04 |
| 2020/0167558 | A1* | 5/2020 | Yang | G06V 30/413 |
| 2020/0302016 | A1* | 9/2020 | Aggarwal | G06V 30/414 |
| 2021/0271805 | A1* | 9/2021 | Comeau | G06V 30/413 |
| 2021/0397986 | A1* | 12/2021 | Aggarwal | G06F 40/103 |
| 2022/0245958 | A1* | 8/2022 | Mehra | G06N 20/00 |

FOREIGN PATENT DOCUMENTS

| | | | | |
|---|---|---|---|---|
| EP | | 3570208 A1 * | 11/2019 | G06K 9/00449 |
| WO | WO-2007023992 A1 * | | 3/2007 | G06F 16/434 |

OTHER PUBLICATIONS

Disclosed Anonymously, "An Unsupervised Neuro-Symbolic Approach for Cell Retrieval and QA Over Tables", IPCOM000265080D, Feb. 23, 2021, 5 Pages. https://priorart.ip.com/IPCOM/000265080.
Disclosed Anonymously, "System and Method for Data Extraction from Complex Tables in Scanned Documents", IPCOM000264851D, Jan. 31, 2021, 9 Pages. https://priorart.ip.com/IPCOM/000264851.
Livathinos, et al., "Robust PDF Document Conversion Using Recurrent Neural Networks", Association for the Advancement of Artificial Intelligence, Feb. 18, 2021, 9 pages. https://arxiv.org/pdf/2102.09395.pdf.
Oltramari et al., "Neuro-symbolic Architectures for Context Understanding", Knowledge Graphs for eXplainable Artificial Intelligence: Foundations, Applications and Challenges, Bosch Research & Technology Center, Mar. 9, 2020, 18 Pages. https://arxiv.org/pdf/2003.04707.pdf.
Rastogi, et al., "Information Extraction from Document Images via FCA based Template Detection and Knowledge Graph Rule Induction", Computer Vision Foundation, 2020, 9 Pages. https://openaccess.thecvf.com/content_CVPRW_2020/papers/w34/Rastogi_Information_Extraction_From_Document_Images_via_FCA-Based_Template_Detection_and_CVPRW_2020_paper.pdf.
Skrlj, et al., "autoBOT: Evolving Neuro-Symbolic Representations for Explainable Low Resource Text Classification", Machine Learning, Published online: Apr. 14, 2021, 40 Pages. https://link.springer.com/content/pdf/10.1007/s10994-021-05968-x.pdf.
Staar, et al., "Corpus Conversion Service: A Machine Learning Platform to Ingest Documents at Scale", KDD, Aug. 19-23, 2018, 9 Pages. https://dl.acm.org/doi/10.1145/3219819.3219834.
Yi et al., "CLEVRER: The first video dataset for neuro-symbolic reasoning", MIT-IBM Watson AI Lab, Published Sep. 25, 2019, 24 Pages. https://mitibmwatsonailab.mit.edu/research/blog/clevrer-the-first-video-dataset-for-neuro-symbolic-reasoning/.
Zhong, et al., "PubLayNet: largest dataset ever for document layout analysis", Aug. 16, 2019, 8 Pages. https://arxiv.org/pdf/1908.07836.pdf.

* cited by examiner

GENERATING A STRUCTURE OF A PDF-DOCUMENT

BACKGROUND

The invention relates in general to the field of extracting content of a PDF-document and, in particular, to a method and a system for generating a structure of a PDF-document.

It is known to use machine learning systems to perform text classification. In order to process a text of a PDF-document by means of the machine learning systems, the text elements of the PDF-document may be processed, for example, using the Bag-of-words (BoW) format. In further examples, sequences of text elements of a PDF-document may be processed using transformer-based language models, such as Bidirectional Encoder Representation from Transformers (BERT). A text structure of the PDF-document may be captured using these text processing methods. The text structure may serve to generate a knowledge graph as a dense representation of a content of the PDF-document.

SUMMARY

Various embodiments provide a computer system and computer program product for generating a structure of a PDF-document and a method as described by the subject matter of the independent claims. Advantageous embodiments are described in the dependent claims. Embodiments of the present invention can be freely combined with each other if they are not mutually exclusive.

In one aspect, the invention relates to a computer-implemented method for generating a structure of a PDF-document, wherein the PDF-document comprises elements, the method comprising:

detecting document cells of the PDF-document dependent on commands of a page description language for printing the elements of the PDF-document, wherein the PDF-document comprises the commands;

determining parts of the PDF-document dependent on the PDF-document by a machine learning module (ML-module), the determining of the respective part comprising associating a respective portion of the elements of the PDF-document with the respective part;

assigning a respective label to the respective part;

using a symbolic artificial intelligence module (AI-module), wherein the using of the symbolic AI-module comprises applying rules of the symbolic AI-module for reconciling the document cells with the parts;

generating and labelling elements of the structure of the PDF-document dependent on a result of the reconciling and dependent on the respective label to the respective part.

In another aspect, the invention relates to a computer program product for generating a structure of a PDF-document, wherein the PDF-document comprises elements, the computer program product comprising one or more computer-readable storage media, and program instructions collectively stored on the one or more computer-readable storage media, the program instructions comprising:

instructions for detecting document cells of the PDF-document dependent on commands of a page description language for printing the elements of the PDF-document, wherein the PDF-document comprises the commands;

instructions for determining parts of the PDF-document dependent on the PDF-document by a machine learning module (ML-module), the determining of the respective part comprising associating a respective portion of the elements of the PDF-document with the respective part;

instructions for assigning a respective label to the respective part;

instructions for using a symbolic artificial intelligence module (AI-module), wherein the using of the symbolic AI-module comprises applying rules of the symbolic AI-module for reconciling the document cells with the parts;

instructions for generating and labelling elements of the structure of the PDF-document dependent on a result of the reconciling and dependent on the respective label to the respective part.

In another aspect, the invention relates to a computer system for generating a structure of a PDF-document, wherein the PDF-document comprises elements, the computer system being configured for:

detecting document cells of the PDF-document dependent on commands of a page description language for printing the elements of the PDF-document, wherein the PDF-document comprises the commands;

determining parts of the PDF-document dependent on the PDF-document by a machine learning module (ML-module), the determining of the respective part comprising associating a respective portion of the elements of the PDF-document with the respective part;

assigning a respective label to the respective part;

using a symbolic artificial intelligence module (AI-module), wherein the using of the symbolic AI-module comprises applying rules of the symbolic AI-module for reconciling the document cells with the parts;

generating and labelling elements of the structure of the PDF-document dependent on a result of the reconciling and dependent on the respective label to the respective part.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
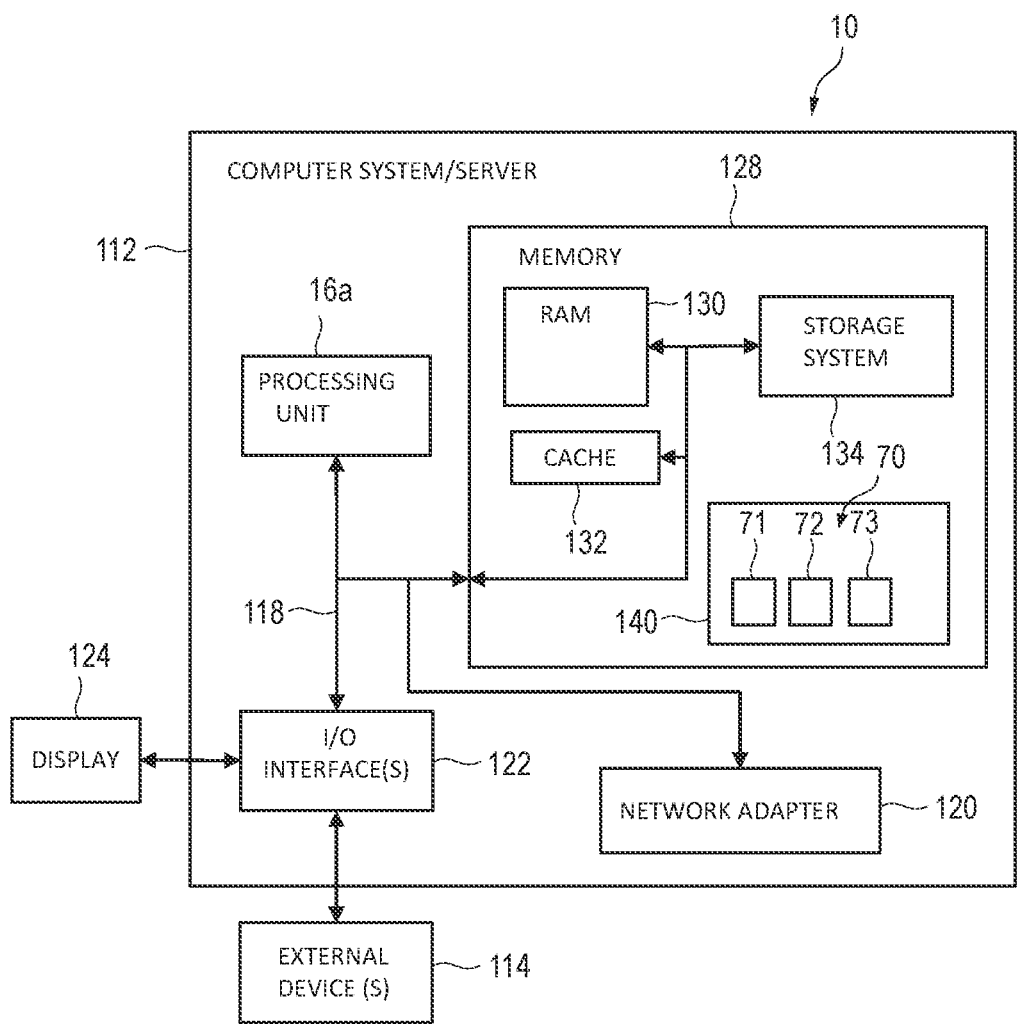
FIG. 1 depicts a block diagram schematically illustrating a computer system according to an example of the present subject matter.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer system may perform the detecting of each document cell. In one example, the detecting of each document cell may comprise detecting a respective position of the respective document cell. Alternatively, or in addition, the detecting of each document cell may comprise detecting a respective size of the respective document cell. The respective document cell may prescribe a position of a respective printing entity on a physical page by means of the position of the respective document cell. The respective printing entities may each comprise one or more elements of the PDF-document. In one example, the respective printing entity may be a respective collection of characters or words of the PDF-document which may have at least one common feature, such as a common font size or font type, for example. Furthermore, in one example, the respective printing entity may be a collection of pixel values for printing a respective image.

In most cases, the respective printing entity may be an input value of a respective command of the commands of the page description language for printing the respective printing entity, also referred to as commands in this disclosure. Furthermore, the position of the respective document cell may be a further input value of the respective command. The position of the respective document cell may be in the form of respective coordinate values of a coordinate system for printing the pages. The commands may be visible by opening the PDF-document with a text editor that does not automatically interpret PDFs. However, the commands may not be readable for a human via the text editor.

An association between each printing entity and the respective document cell for prescribing the position of the respective printing entity may be provided by the respective command for printing the respective printing entity.

In one example, the computer system may detect the respective document cell by detecting the coordinate values of the respective document cell in the form of the further input value of the respective command for printing the respective printing entity which is associated with the respective document cell.

The document cells may be considered as abstract entities which may be designed for dividing the pages of the PDF-document. In case only the positions of the document cells are provided, the pages may be divided into respective subareas using the positions of the document cells, wherein each subarea covers one of the respective positions of the document cells. In this case, the document cells may be provided in the form of only the positions of the document cells. In case the positions and the sizes of the document cells are provided, the pages may be divided into the respective subareas, wherein each subarea covers one of the respective positions of the document cells and comprises the size of the respective document cell. In this case, the document cells may be provided in the form of the positions and the sizes of the document cells. The size of the respective document cell may be provided in the form of a second further input value of the respective command for printing the respective printing entity which is associated with the respective document cell. The second further input value of the respective command may comprise an indication of a width and/or a height of the respective document cell. In one example, the position and the size of the respective document cell may be provided together in the form of coordinate values of two corners of the respective document cell. The two corners of the respective document cell may build a diagonal of the respective document cell. In this case, the coordinate values of the two corners of the respective document cell may be provided in the form of the further input value of the respective command. In this case, when the respective document cell comprises a form of a respective polygon, then the position and the size of the respective document cell may be provided in the form of coordinate values of corners of the respective polygon.

The document cells may be considered as bounding boxes for printing the printing entities. Furthermore, a third further input value of the respective command for printing the respective printing entity which is associated with the respective document cell may comprise an indication of a color and/or an angle of the respective printing entity.

In one example, the computer system may detect the respective document cell by detecting the width and/or the height of the respective document cell in the form of the second further input value of the respective command for printing the respective printing entity which is associated with the respective document cell.

A PDF generator program, may generate the commands such that the commands may comprise the input values and the further input values and, in one example, the second input values dependent on a basis document. The basis document may be a Word®-document (Word and all Word-based trademarks and logos are trademarks or registered trademarks of Microsoft Corporation and/or its affiliates), in one example. The basis document may comprise the elements of the PDF-document in a format of the basis document, for example in the format of Word®. Furthermore, the PDF generator program may select the respective commands from a set of available printing commands dependent on the respective printing entities.

The elements of the PDF-document may be human readable elements, such as text elements, (e.g., words or phrases, single characters, Greek letters for printing formulas or Roman letters for printing standard text, parts of an image, images, lists, lists items, and/or tables or parts of a table). The respective part may be a respective cluster of text elements, a respective cluster of image elements, a respective image, a respective text paragraph, a respective formula, a respective heading line, a respective heading, a respective caption and/or a respective footer, for example.

The elements and the parts of the PDF-document may be made visible for a human by opening the PDF-document by means of a PDF reader program, such as Acrobat Reader® (Acrobat Reader and all Acrobat Reader-based trademarks and logos are trademarks or registered trademarks of Adobe Inc. and/or its affiliates), for example. The PDF generator program may generate the printing entities dependent on the elements of the PDF-document provided in the format of the basis document by means of the basis document, though not every element of the PDF-document may be converted into one respective printing entity. In most cases, the printing entities may be designed to optimize a usage of a printhead of a printer with respect to a printing process of the PDF-document, such as a printing time for printing the PDF-document, dependent on the elements of the PDF-document.

In one example, the machine learning module (ML-module) may determine the parts of the PDF-document dependent on data for visualizing the elements of the PDF-document, in the following referred to as visualization data. In one example, the computer system may generate the visualization data dependent on the basis document and/or the PDF-document. According to one embodiment, the computer system may generate the visualization data dependent on the commands. In one example, the visualization data may be data which may be processible by means of a graphic processor for displaying the elements of the PDF-document such that a human may be able to read the elements of the PDF-document, in the following referred to as graphic processor data. The computer system may comprise a data conversion module for generating the graphic processor data dependent on the PDF-document.

In one example, the visualization data may be provided in the form of image files. In one example, the computer system may execute a conversion program, such as pdf2ppm, to convert pages of the PDF-document into the image files in a PNG ("Portable Network Graphics") format. In one example, the machine learning module (ML-module) may determine the respective part of the PDF-document dependent on the respective image file, a subset of the image files or the image files as a whole. According to one example, the respective image files may each be a respective screenshot of a respective page of the pages. This may have the advantage that no customized software, such as the data conversion module, may be needed for providing the visualization data on the basis of the PDF-document. The computer system may open the PDF-document, for example, by means of the PDF reader program, and automatically generate the respective screenshot of the respective page. The computer system may automatically skip from page to page within the PDF-document while generating the screenshots.

According to one example, the associating of the respective portion of the elements of the PDF-document with the respective part may involve generating respective data for describing a bounding box bounding the respective part, wherein the bounding box bounding the respective part may indicate the respective part. The bounding box bounding the respective part may bound the respective portion of the elements of the PDF-document which is associated with the respective part. The bounding box bounding the respective part may be visualizable on a monitor. In one example, the computer system may be configured to visualize the bounding boxes bounding the respective parts and the respective portions of elements of the PDF-document. The respective data for describing the bounding box bounding the respective part, also referred to as respective box data in the following, may comprise a respective position and/or respective size of the bounding box bounding the respective part on the pages. The computer system may provide the respective box data in the form of a respective box data file. Thus, the parts may be indicated by means of a set of the box data files.

According to one example, the associating of the respective portion of the elements of the PDF-document with the respective part may involve generating a respective data unit comprising the respective portion of the elements of the PDF-document or a respective set of identifiers for identifying the respective portion of the elements of the PDF-document. In one example, the respective data unit may be a respective row of a data matrix. Generally, the associating of the respective portion of the elements of the PDF-document with the respective part may be considered as a clustering or grouping of the respective portion of the elements of the PDF-document resulting in a respective cluster or group, wherein the respective cluster or group may form the respective part. Thus, the determining of the respective parts may be considered as a determining of the respective clusters or groups. In one example, the respective part may be represented by the respective data unit.

The computer system may perform the assigning of the respective label to the respective part. In one example, the ML-module or a further ML-module may assign the respective label to the respective part.

In one example, the rules for reconciling the document cells with the parts may comprise reconciling one or more features of the document cells with one or more features of the parts and/or with one or more features of the elements of the PDF-document. Thus, in one embodiment, the reconciling of the document cells with the parts may comprise reconciling the document cells with the elements of the PDF-document. In one example, the one or more features of the respective document cell may comprise the position and/or size of the respective document cell. In one example, the one or more features of the respective part may comprise the respective position and/or respective size of the bounding box bounding the respective part. In one example, the one or more features of the elements of the PDF-document may comprise a respective position and/or size of the respective element of the PDF-document on the pages. In one example, the reconciling of the features may comprise adapting the features, for example the size and/or position, of the parts or elements of the PDF-document to the features, such as the size or position of the document cells.

The generating of the elements of the structure of the PDF-document, in the following also referred to as structure, may comprise generating a respective element of the structure corresponding to one respective part of the parts of the PDF-document, also referred to as a respective twin element in the following. In one example, the generating of the elements of the structure may comprise generating a respective further element of the structure corresponding to one of the document cells or to one group of document cells which is or which are not bounded by any of the bounding boxes bounding the respective parts, in the following referred to as respective orphan structure element. The labelling of the elements of the structure may comprise labelling the respective twin element according to the label of its corresponding part of the PDF-document. Furthermore, in one example, the labelling of the elements of the structure may comprise labelling the respective orphan structure element as a text element by default.

The structure may be represented by means of a data structure comprising data elements. In one example, the data structure may be a knowledge graph or a matrix. Each data element may correspond to one respective element of the structure. In one example, the respective data element may comprise the respective label of the element of the structure which corresponds to the respective data element.

In one example, the elements of the structure, for example the data elements, may be linked to the elements of the PDF-document.

For example, each twin element of the structure may be associated with the respective portion of elements of the PDF-document that is associated with the respective part of the PDF-document which corresponds to the respective twin element of the structure. These portions of elements of the PDF-document may be referred to as twin portions of elements in the following. In one example, the respective twin element of the structure may comprise the twin portions of elements. In one example, the computer system may write the respective twin portion of the elements of the PDF-document in the respective data element which corresponds to the respective twin element of the structure which is thereby linked to the respective twin portion of elements.

In one example, the respective orphan structure element of the structure may be associated with the respective portion of elements of the PDF-document which is associated with the respective document cell or to the respective group of document cells which is or which are not bounded by any of the bounding boxes bounding the respective parts. These portions of elements of the PDF-document may be referred to as orphan portions of elements in the following.

In one example, the respective orphan structure element of the structure may comprise the orphan portions of elements. In one example, the computer system may write the respective orphan portion of the elements of the PDF-document in the respective data element which corresponds to the respective orphan structure element of the structure which is thereby linked to the respective orphan portion of elements.

The symbolic AI-module and its rules for the reconciling may be designed such that a human may be able to understand these rules. Thus, the symbolic AI-module may be considered as a white box model. Contrarily, the ML-module may be considered as a black box model in most cases.

According to one example, the AI-module may generate and label the elements of the structure. In this example, the AI-module may generate and label the elements of the structure according to one of the embodiments described above. For example, the AI-module may generate the data structure according to one of the embodiments mentioned above.

The proposed method may allow the use of information about the document cells, for example, the positions and/or the sizes of the document cells, for generating the structure of the PDF-document. The information about the document cells may be considered as additional information to information which may be processible by means of the ML-module, for example, the visualization data, or to information produced by means of the ML-module, such as information about the respective parts by determining the respective parts. Generally, additional information given to any analytic system may enhance a performance of such an analytic system. For example, a result of the ML-module, such as the respective parts, may be corrected using the information about the document cells.

In order to process the information about the document cells, the document cells may be reconciled with the parts using the rules for the reconciling. The elements of the structure may be generated and labelled dependent on the result of the reconciling and dependent on the labels of the parts. The advantage of using the rules for the reconciling in the form of the rules of the symbolic AI-module for fusing the information about the document cells with the information which may be produced by means of the ML-module (e.g., the information about the respective parts), is that such a fusing of information may be understood by a human and therefore may be easier to control.

The ML-module may be a module that can be used to perform a calculation of an output dataset of the ML-module on the basis of an input dataset of the ML-module. In one example, the input dataset may represent a request for using the ML-module. The ML-module may comprise a neuronal net, a convolutional neuronal net, and/or a radial basis function net. The input dataset and the output dataset of the ML-module may comprise values, preferably real values, such as elements. The calculation of the output dataset may be performed dependent on values of parameters of the ML-module and dependent on the input dataset.

According to one embodiment, the determining of the parts may comprise recognizing the parts dependent on the visualization data for displaying the PDF-document by means of the ML-module. This may have the advantage that the ML-module may function as an image detection module. In this case, advances in the field of image detection which are state of the art may be easily incorporated into the ML-module and by that into the method for generating the structure of the PDF-document.

According to one example, the input dataset of the ML-module may be the visualization data. In one embodiment, the input dataset of the ML-module may be provided in the form of the image files, hence the input dataset may be a set of the image files. According to one example of this embodiment, the output dataset may comprise the set of box data files. In one example, the image files may comprise pixel values for displaying the PDF-document including the elements of the PDF-document.

According to a further embodiment, the input dataset of the ML-module may be one image file of the set of the image files. According to one example of this embodiment, the output dataset may be one box data file of the set of box data files.

The ML-module may be in a trained state or in an untrained state. The ML-module may be in the trained state for using the ML-module for determining the parts dependent on the PDF-document.

In the untrained state, the values of the parameters may be equal to random values. This may be achieved by performing an initialization of the ML-module, wherein the values of the parameters may be set to random values. A training of the ML-module may be performed on the basis of training datasets, each training dataset comprising an input dataset and an output dataset.

The respective input and the output dataset of the training datasets may have elements. These elements may be values, preferably real values, similar to the elements of the input dataset and the output dataset of the ML-module. The training datasets may represent information about an object detection, classification, or regression problem, for which the ML-module may be used, once the ML-module is trained with the training datasets. With respect to the usage of the ML-module for determining the parts, each of the values of the output dataset of each training dataset may be a respective training box data file describing a respective training bounding box. The values of each input dataset of the respective training datasets may be values of a respective training image file, for example, pixel values of the respective training image file. The respective training image file may comprise human readable elements of a training PDF-document.

In one example, the values of the output dataset of each training dataset may each comprise several training box data files describing a respective training bounding box. In this case, the values of each input dataset of the respective training datasets may also comprise the values of the respective training image file, for example, the pixel values of the respective training image file.

The computer system may perform the training such that the values of the parameters may be adapted to reduce a training error of the ML-module. The training error may be calculated on the basis of deviations of calculated values of training output datasets of the ML-module calculated by the ML-module and the values of each output dataset of the respective training dataset. Each training output dataset of the ML-module may be calculated on the basis of the input dataset of the respective training dataset and may therefore be associated with the respective training dataset. The training output datasets of the ML-module may have the same structure as the output datasets of the training datasets (i.e., types of elements of the training output datasets of the ML-module may match types of elements of the output datasets of the training datasets).

Adapting the values of the parameters of the ML-module on the basis of the deviations may reduce the training error. If the training error reaches a given threshold, the ML-module may be regarded as being trained and may be in the trained state. Adapting the values of the parameters of the ML-module may be performed using one or more learning algorithms such as linear regression, backpropagation, K-means, etc. and may be referred to as "machine learning" in the following. Hence, the "machine learning module" described herein. The machine learning may be applied to the ML-module in order to change the state of the ML-module from the untrained state to an intermediate state or to the trained state or from the intermediate state to the trained state. The ML-module may have different training states (e.g., the intermediate trained state, between the untrained and the trained state). In each different training state, the ML-module may comprise a different combination of values of the parameters of the ML-module.

According to one embodiment, the PDF-document may comprise the pages mentioned above and the detecting of the document cells of the PDF-document dependent on the commands may comprise detecting the respective position of the respective document cell, for example, as described above. Furthermore, according to this embodiment, the determining of the parts may comprise determining a respective position of the respective part on the pages. The determining of the respective position of the respective part on the pages may be provided by calculating the respective box data file which may describe the respective part including the position of the respective part. The ML-module may calculate the respective box data file dependent on the PDF-document as described above.

In one example, the using of the symbolic AI-module may comprise applying rules for reconciling the positions of the document cells with the positions of the parts. In one example, the generating and/or the labelling of the elements of the structure of the PDF-document may comprise generating and/or labelling the elements of the structure of the PDF-document dependent on a result of the reconciling of the positions. This embodiment may have the advantage, for example, that the orphan portions of elements described above may be detected by comparing the positions of the document cells and the positions of the parts.

According to one embodiment, the detecting of the document cells of the PDF-document dependent on the commands may comprise detecting the respective size of the respective document cell. Furthermore, according to this embodiment, the determining of the parts may comprise determining the respective size of the respective part. In one example, the using of the symbolic AI-module may comprise applying rules for reconciling the sizes of the document cells with the sizes of the parts. In one example, the generating and/or the labelling of the elements of the structure of the PDF-document may comprise generating and/or labelling the elements of the structure of the PDF-document dependent on a result of the reconciling of the sizes. The reconciling of the sizes of the document cells with the sizes of the parts may comprise performing an examination if document cells are bounded by two bounding boxes bounding the respective parts which may indicate two different parts. Thus, reconciling the sizes may have the advantage to detect overlapping boxes for the respective parts which may each comprise the same element of the PDF-document.

According to one embodiment, the method may further comprise determining further parts of the PDF-document dependent on the document cells. According to this embodiment, the method may further comprise assigning a respective label to the respective further part. In one example, the using of the symbolic AI-module may comprise applying rules for reconciling the labels of the parts with the labels of the further parts. In one example, the generating and the labelling of the elements of the structure of the PDF-document may comprise generating and labelling the elements of the structure of the PDF-document dependent on a result of the reconciling of the labels of the parts with the labels of the further parts. The reconciling of the labels of the parts with the labels of the further parts may allow for correction of the labels of the parts on the basis of the labels of the further parts. Thus, an accuracy of the labels of the parts may be enhanced. In one example, the determining of the respective further part may comprise associating a respective portion of the document cells of the PDF-document with the respective further part. In one example, one or more of the respective portions of the document cells may comprise only one document cell. In a further example, one or more of the respective portions of the document cells may comprise several document cells of the document cells.

According to one embodiment, the method may further comprise determining features of the commands of the page description language dependent on the PDF-document. According to this embodiment, the assigning of the labels of the further parts may comprise assigning the labels of the further parts dependent on the features of the commands. The features of the respective commands may comprise the position and/or size of the document cells indicated by the respective commands, a respective font size, and/or font type indicated by the respective commands. Generally, the features of the respective commands may comprise any feature for describing the respective printing entities which may be printable dependent on the respective commands. Using the features of the commands for assigning the labels of the further parts may allow for use of these features as further information, such as the font size or type of the PDF-document for generating the structure of the PDF-document. For example, as a large or bold font tend to indicate a section-header, such a feature may be used in order to detect the section-header and generate the detected section header as one of the elements of the structure. In another example, a small font of one of the text elements may indicate a footnote if one of the document cells comprising this text element is located near a bottom of a page of the PDF-document.

According to one embodiment, the method may further comprise generating sequences dependent on the features of the commands, the assigning of the labels of the further parts comprising assigning the labels of the further parts dependent on the sequences of the commands. The sequences may comprise consecutive commands which may be arranged consecutively in the description language for printing the elements of the PDF-document. Generating the sequences may allow for use of a transformer-based module for assigning the labels of the further parts dependent on the features of the commands.

Consequently, according to one embodiment, the method may further comprise assigning the labels of the further parts using the transformer-based module (transformer module). The transformer module may be a deep learning module. The transformer module may be designed to translate an input sequence of characters into an output sequence of characters. A respective input sequence of the transformer module may be one of the sequences. A respective output sequence of the transformer module may be one of the labels of the further parts. Thus, in one example, the respective further part may be determined by labelling one respective sequence of the sequences by means of the transformer module.

Using the transformer module may comprise using a pretrained machine learning language module, such as BERT (Bidirectional Encoder Representations from Transformers), for example. In one example, the transformer module may comprise the pretrained machine learning module BERT. Using the pretrained machine learning module may be one advantage of using the transformer module. In one example, the pretrained machine learning module may be retrained using the features of the commands, such as geometrical features of the document cell, for example, the position and/or sizes of the document cells, in order to adapt the transformer module.

The computer system may comprise a further ML-module. The further ML-module may be designed for assigning the labels of the further parts dependent on the features of the commands. In one example, the further ML-module may be or comprise the transformer module. Thus, the further ML-module may comprise hundreds or thousands of hidden layers to enable deep learning.

The further ML-module may be a module that can be used to perform a calculation of an output dataset of the further ML-module on the basis of an input dataset of the further ML-module. In one example, the input dataset of the further ML-module may represent a request for using the further ML-module. The further ML-module may comprise a neuronal net, a convolutional neuronal net, and/or a radial basis function net. The input dataset and the output dataset of the further ML-module may comprise values, preferably real values, as elements. The calculation of the output dataset of the further ML-module may be performed dependent on values of parameters of the further ML-module and dependent on the input dataset of the further ML-module.

According to one example, the input dataset of the further ML-module may be one of the sequences. According to one example of this embodiment, the output dataset of the further ML-module may comprise one of the labels of the further parts.

The further ML-module may be in a trained state or in an untrained state. The further ML-module may be in the trained state for using the further ML-module for determining the further parts dependent on the sequences.

In the untrained state, the values of the parameters of the further ML-module may be equal to random values. This may be achieved by performing an initialization of the further ML-module, wherein the values of the parameters of the further ML-module may be set to random values. A training of the further ML-module may be performed on the basis of training datasets of the further ML-module, each training dataset of the further ML-module comprising an input dataset and an output dataset.

The respective input and the output dataset of the training datasets of the further ML-module may have elements. These elements may be values, preferably real values, similar to the elements of the input dataset and the output dataset of the further ML-module. The training datasets of the further ML-module may represent information about a sequence transformation problem, or a classification or regression problem, for which the further ML-module may be used once it is trained with the training datasets of the further ML-module. With respect to the usage of the further ML-module for determining the further parts, the values of the output dataset of each training dataset may comprise characters of a respective training label. The values of each input dataset of the respective training datasets of the further ML-module may be characters of a respective training sequence obtained by parsing printing commands of training PDF-documents.

The computer system may perform the training of the further ML-module such that the values of the parameters of the further ML-module may be adapted to reduce a training error of the further ML-module. The training error of the further ML-module may be calculated on the basis of deviations of calculated values of training output datasets of the further ML-module calculated by the further ML-module and the values of each output dataset of the respective training dataset of the further ML-module. Each training output dataset of the further ML-module may be calculated on the basis of the input dataset of the respective training dataset of the further ML-module and may therefore be associated with the respective training dataset of the further ML-module. The training output datasets of the further ML-module may have the same structure as the output datasets of the training datasets of the further ML-module (i.e., types of elements of the training output datasets of the further ML-module may match types of elements of the output datasets of the training datasets of the further ML-module).

Adapting the values of the parameters of the further ML-module on the basis of the deviations may reduce the training error of the further ML-module. If the training error reaches a given threshold, the further ML-module may be regarded as being trained and may be in the trained state. Adapting the values of the parameters of the further ML-module may be performed using one or more learning algorithms such as linear regression, backpropagation, K-means, etc. and may be referred to as "machine learning" in the following. Hence, the "machine learning module" described herein. The machine learning may be applied to the further ML-module in order to change the state of the further ML-module from the untrained state to an intermediate state or to the trained state, or from the intermediate state to the trained state. The further ML-module may have different training states (e.g., the intermediate trained state, between the untrained and the trained state). In each different training state the further ML-module may comprise a different combination of values of the parameters of the further ML-module.

According to one embodiment, the determining of the further parts may comprise determining the further parts dependent on the result of the reconciling of the document cells with the parts. For example, the computer system may determine the further parts dependent on the result of the reconciling of the position and sizes of the document cells with the positions and sizes of the parts using the rules of the symbolic AI-module. This may have the advantage that the symbolic AI-module may be used for reconciling the position and sizes and for reconciling the labels.

According to one embodiment, the method may further comprise performing a correction of the labels of the parts dependent on the document cells. In one example, the assigning of the labels of the further parts may comprise assigning the labels of the further parts dependent on a result of the correction of the labels of the parts. This embodiment may allow for use of the information about the document cells for correcting the labels of the parts. The correction of the labels of the parts may be performed using the rules of the symbolic AI-module.

According to one embodiment, the method may further comprise generating the rules for reconciling the document cells with the parts dependent on a training data set, also referred to as rules in the following, and provisional rules. The training data set may comprise training labels and training PDF-documents with elements. The respective elements of the training PDF-documents may each be associated with one of the training labels. The generating of the rules may comprise performing repetitions of the steps of the method for generating the structure of the PDF-document using a respective one of the training PDF-documents instead of the PDF-document and the provisional rules instead of the rules for the reconciling resulting in labels of the respective elements of the structure of the respective training PDF-document.

The steps of the method for generating the structure of the PDF-document may comprise:

detecting the document cells of the PDF-document dependent on the commands of the page description language for printing the elements of the PDF-document, wherein the PDF-document comprises the commands;

determining parts of the PDF-document dependent on the PDF-document using the machine learning module (ML-module), the determining of the respective part comprising associating the respective portion of the elements of the PDF-document with the respective part;

assigning the respective label to the respective part;

using the symbolic artificial intelligence module (AI-module), wherein the using of the symbolic AI-module comprises applying the rules of the symbolic AI-module for reconciling the document cells with the parts;

generating and labelling the elements of the structure of the PDF-document dependent on the result of the reconciling and dependent on the labels of the parts.

The generating of the rules may further comprise performing a respective comparison between the labels of the respective elements of the structure of the respective training PDF-document and the training labels of the respective elements of the respective training PDF-document in each repetition. The generating of the rules may further comprise modifying the provisional rules dependent on a result of the comparisons. The generating of the rules may further comprise defining the rules for the reconciling as the modified provisional rules. The computer system may perform the steps of the method for generating the structure of the PDF-document for generating the rules according to one of the embodiments of the method for generating the structure of the PDF-document described above.

The generating of the rules dependent on the training data set may have the advantage of adjusting the provisional rules in an automated manner in order to generate the rules on the basis of the provisional rules.

According to one embodiment, the method may further comprise performing a statistical analysis of a performance of the provisional rules dependent on a result of the performing of the repetitions of the steps of the method for generating the structure of the PDF-document. According to this embodiment, the generating of the rules may comprise generating the rules dependent on the statistical analysis. The statistical analysis may allow for selection of the rules from the provisional rules dependent on the performance of the provisional rules. For example, the statistical analysis may reveal that one of the provisional rules does not influence the labelling of the parts significantly. Consequently, such a provisional rule may not be contained by the rules.

According to one embodiment, the detecting of the document cells may comprise parsing the commands of the page description language. In one example, the computer system may parse a content of a text document comprising the commands for printing the printing entities and by that parse the commands. The text document may be written in the page description language. The text document may be generated by opening the PDF-document by means of a text editor and saving it as a text file. The computer system may apply a parser module for a parsing of the commands. The advantage of the parsing is that nearly all features of the commands may be captured compared to a method which may be based on machine learning for detecting the commands based on the page description language. Applying the parser module has the advantage of using knowledge about the page description language.

According to one embodiment, the detecting of the document cells may comprise detecting the document cells by means of optical character recognition (OCR). According to this embodiment, the respective document cell may be detected by detecting at least one of the inputs of the respective command by means of OCR, for example, the further input value or the second further input value of the respective command. This embodiment may have the advantage that the parser module does not need to be created. It may be easier to use a standard OCR-tool.

According to one embodiment, the reconciling of the sizes of the document cells with the sizes of the parts may comprise performing a modification of the size of at least one part. According to this embodiment, the reconciling of the sizes may further comprise reassociating at least one element of the respective portion of the elements of the PDF-document which is associated with that part dependent on a modification of the size of that part. This embodiment may allow for correction of a wrongly performed association of one element of the PDF-document to one of the parts.

According to one embodiment, the reconciling of the positions of the document cells with the positions of the parts may comprise detecting an element of the PDF-document which is not assigned to any part (orphan element). According to this embodiment, the method may further comprise labelling the orphan element. This embodiment may allow to incorporate the orphan element into the structure of the PDF-document although the orphan element may not be detected by the ML-module. Hence, this embodiment may enhance a quality of the structure of the PDF-document. The orphan element may be one of the orphan portions of elements described above.

According to one embodiment, the method may further comprise determining the sequences of the commands of the page description language dependent on the PDF-document as described above. According to this embodiment, the assigning of the label of the orphan element may comprise assigning the label of the orphan element dependent on the sequences of the commands. This embodiment may allow for use of the transformer module for assigning the label of the orphan element.

According to one embodiment, the detecting of the document cells may comprise determining an order of the document cells. The method may further comprise performing the reconciling of the positions of the document cells with the positions of the parts dependent on the order of the document cells. The order of the document cells may be provided by an order of the commands within the text which is written in the page description language. The order of the commands may be considered as further additional information for generating the structure of the PDF-document which may be used according to this embodiment.

Embodiments of the present invention may be implemented using a computing device that may also be referred to as a computer system, a client, or a server. Referring now to FIG. 1, a schematic of an example of a computer system 10 is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

The computer system 10 may comprise a computer system/server 112.

The computer system/server 112 may be operational with numerous other general purpose or special purpose computing system environments or configurations. Examples of well-known computing systems, environments, and/or configurations that may be suitable for use with the computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

The computer system/server 112 may be described in the general context of computer system executable instructions, such as program modules, being executed by a computer system. Generally, program modules may include routines, programs, objects, components, logic, data structures, and so on that perform particular tasks or implement particular abstract data types. The computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, the computer system/server 112 in computer system 10 is shown in the form of a general-purpose computing device. The components of the computer system/server 112 may include, but are not limited to, one or more processors or processing unit 16a, a system memory 128, and a bus 118 that couples various system components including system memory 128 to processor 16a. Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 70, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 70 generally carry out the functions and/or methodologies of embodiments of the invention as described herein.

The term "program" or "program module" as used herein refers to a set of instructions which contains commands to provoke actions performed by the processor 16a when the processor 16a may read the commands. The set of instructions may be in the form of a computer-readable program, routine, subroutine or part of a library, which may be executed by the processor 16a and/or may be called by a further program being executed by the processor 16a. Preferably, the program modules 70 may be executable programs which are compiled according to a type of hardware platform of the computer system/server 112.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
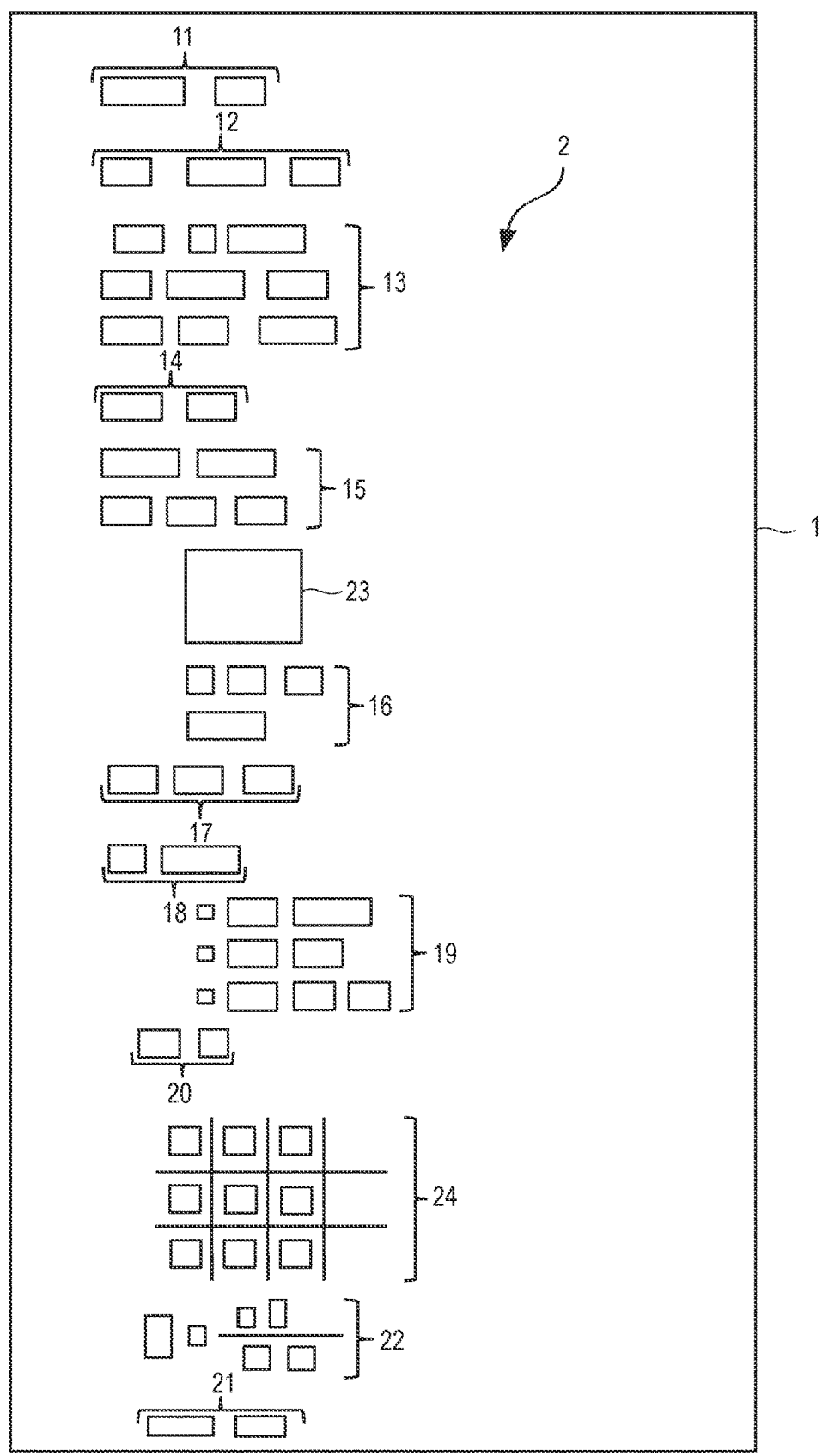
FIG. 2 depicts a block diagram schematically illustrating a PDF-document with elements.
Figure 10:
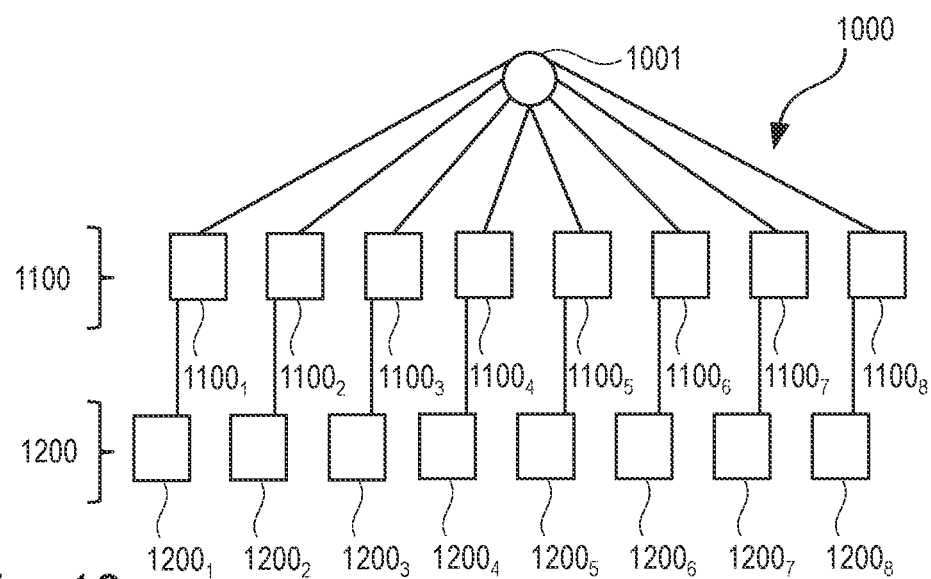
FIG. 10 depicts a block diagram schematically illustrating a structure of the PDF-document shown in FIG. 2.

A computer system such as the computer system 10 shown in FIG. 1 may be configured, and may be used, for performing operations and functions disclosed herein. For example, the computer system 10 may be configured for generating a structure 1000 (FIG. 10) of the PDF-document 1 (FIG. 2). The PDF-document 1 may comprise elements 2 (FIG. 2). The elements 2 may comprise human readable elements, such as text elements, for example, first text elements 11 (FIG. 2), second text elements 12 (FIG. 2), third text elements 13 (FIG. 2), fourth text elements 14 (FIG. 2), fifth text elements 15 (FIG. 2), sixth text elements 16 (FIG. 2), seventh text elements 17 (FIG. 2), eighth text elements 18 (FIG. 2), ninth text elements 19 (FIG. 2), tenth text elements 20 (FIG. 2) and eleventh text elements 21 (FIG. 2). The text elements are each depicted as a respective single box in FIG. 2. The elements 2 may further comprise an image 23, a formula 22, and a table 24. The text elements 11-21 may comprise characters, such as Roman letters for printing standard text. The formula 22 may comprise Greek letters and mathematical symbols. The first text elements 11 may form a heading line, the second text elements 12 may constitute a first heading, the third text elements 13 may represent a first text paragraph, the fourth text elements 14 may form a second heading, the fifth text elements 15 may represent a second text paragraph, the sixth text elements 16 may form a caption, the seventh text elements 17 may constitute a third heading, the eighth text elements 18 may represent a text line, the ninth text elements 19 may represent a list, the tenth text elements 20 a fourth heading and the eleventh elements 21 may form a page footer.

The computer system 10 may be configured for performing a first, second, third and fourth operation. In one example, the processor 16a (FIG. 1) may perform the first, second, third and fourth operation.

Figure 3:
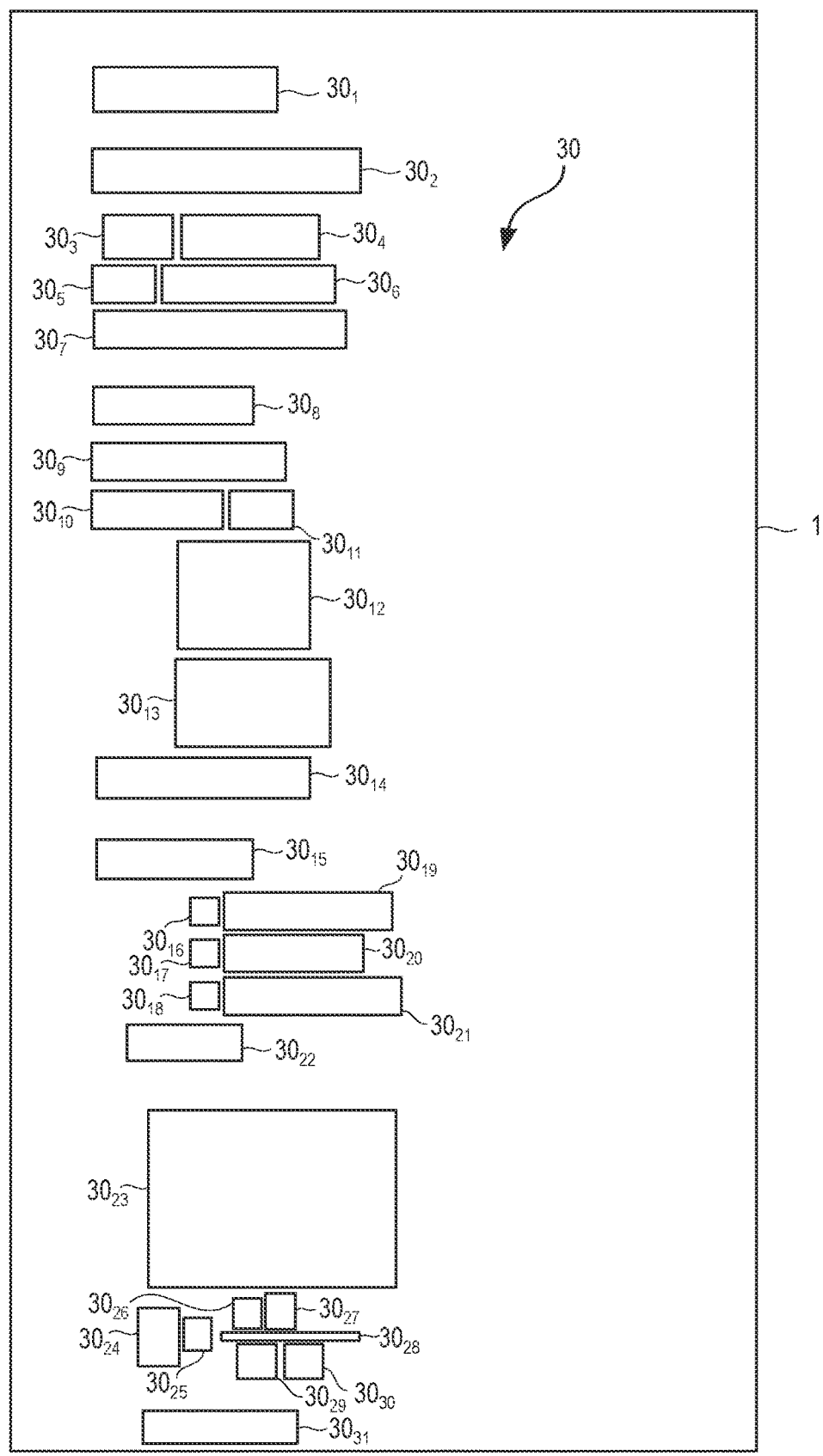
FIG. 3 depicts a block diagram schematically illustrating document cells generated on the basis of the PDF-document shown in FIG. 2.
Figure 4:
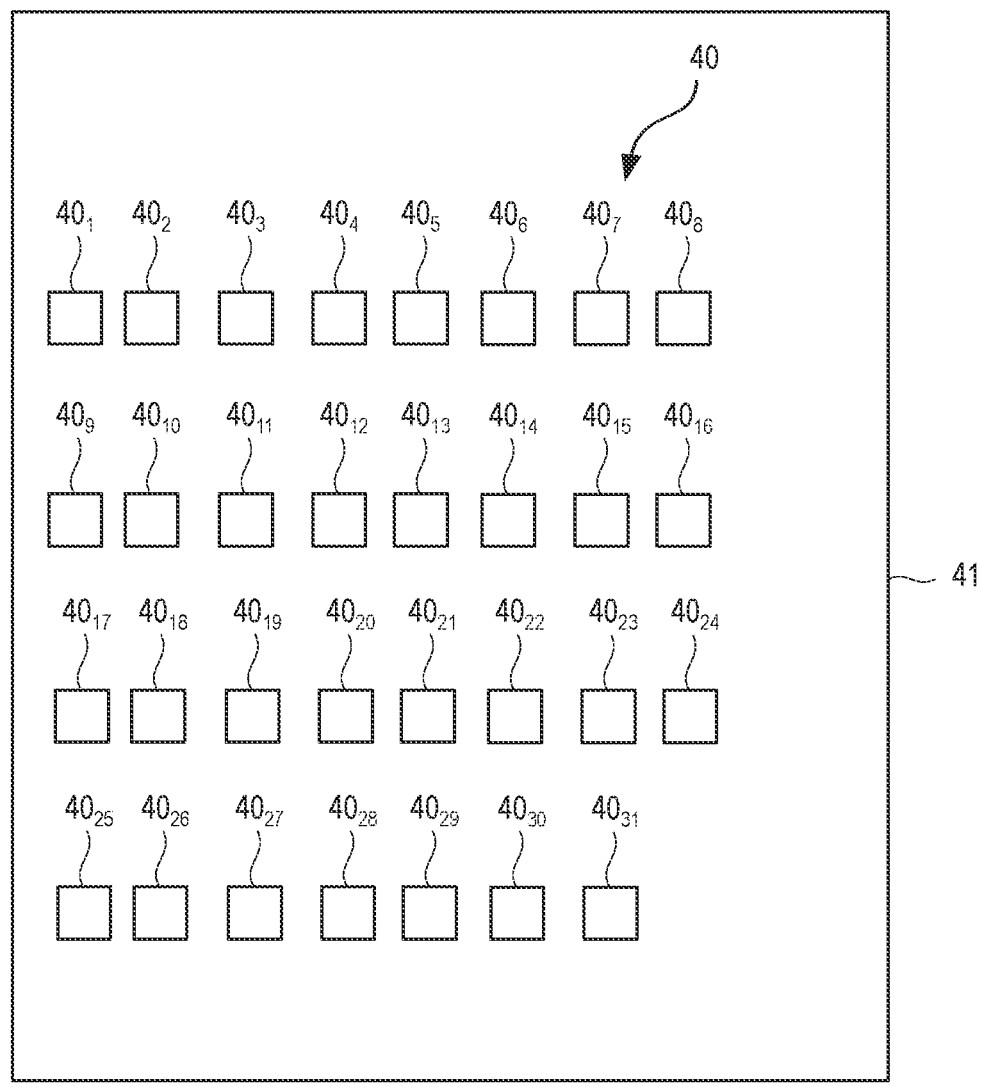
FIG. 4 depicts a block diagram schematically illustrating commands for printing the elements of the PDF-document shown in FIG. 2.

The first operation may comprise detecting document cells 30 of the PDF-document 1 dependent on commands 40 of a page description language for printing the elements 2 of the PDF-document 1. The document cells 30 ($30_1$, $30_2$, $30_3$, $30_4$, $30_5$, $30_6$, $30_7$, $30_8$, $30_9$, $30_{10}$, $30_{11}$, $30_{12}$, $30_{13}$, $30_{14}$, $30_{15}$, $30_{16}$, $30_{17}$, $30_{18}$, $30_{19}$, $30_{20}$, $30_{21}$, $30_{22}$, $30_{23}$, $30_{24}$, $30_{25}$, $30_{26}$, $30_{27}$, $30_{28}$, $30_{29}$, $30_{30}$, $30_{31}$) may be enumerated, as depicted in FIG. 3, starting from a first document cell $30_1$ via a tenth document cell $30_{10}$ up to a thirty-first document cell $30_{31}$. The commands 40 ($40_1$, $40_2$, $40_3$, $40_4$, $40_5$, $40_6$, $40_7$, $40_8$, $40_9$, $40_{10}$, $40_{11}$, $40_{12}$, $40_{13}$, $40_{14}$, $40_{15}$, $40_{16}$, $40_{17}$, $40_{18}$, $40_{19}$, $40_{20}$, $40_{21}$, $40_{22}$, $40_{23}$, $40_{24}$, $40_{25}$, $40_{26}$, $40_{27}$, $40_{28}$, $40_{29}$, $40_{40}$, $40_{31}$) may be enumerated, as depicted in FIG. 4, starting from a first command $40_1$ via a tenth command $40_{10}$ up to a thirty-first command $40_{31}$.

The processor 16a may detect the document cells 30 by means of a parser module 71 (FIG. 1). The parser module 71 may read a text file 41 which may be written in the page description language. The page description language may be in Portable Document Format. In most cases, the page description language may comprise a format which is not readable for humans. In one example, the parser module 71 may parse symbols of the text file 41 for extracting the commands 40 from the text file 41. Thus, the parser module 71 may convert a page description language format of the commands 40 into a human readable character format of the commands 40.

In one example, the parser module 71 may parse the commands 40 consecutively. In one example, the processor 16a may detect the document cells 30 on the basis of the commands 40 written in the human readable character format of the commands 40, in the following also referred to as human readable format. The commands 40 may each comprise the respective printing entity described above in the form of respective first input values and respective coordinate values in the form of respective second input values. The respective printing entity may prescribe a printing process of respective one or more elements of the elements 2 (FIG. 2). Thus, the respective printing entity may comprise information given by the respective one or more elements of the elements 2 either in the human readable character format of the commands 40 or in the page description language format depending on the format of the command which comprises the respective printing entity. In that sense, the respective printing entity may comprise the respective one or more elements of the elements 2.

In one example, the commands 40 may each comprise a respective indication of a size of the respective printing entity. The size of the respective printing entity may be given in the form of a respective width and/or height. The respective width and height of the respective command of the commands 40 may represent a respective bounding box which may bound the one or more elements of the elements 2 on a printed version of the PDF-document 1 which are prescribed by the printing entity of the respective command. As the respective bounding box bounds the respective printing entity of the respective command, the respective bounding box may correspond to the respective command.

In one example, the processor 16a may generate indications of the size of the respective bounding box, for example, the width and/or height of the respective bounding box, dependent on the respective printing entity, for example by means of a size generator module 72 (FIG. 1). In this case, the size of the respective printing entity may not be given explicitly by the respective command of the commands 40 for printing the respective printing entity. The size generator module 72 may comprise functions similar to functions of a module for executing a processor of a printer for printing the PDF-document 1, not shown in the figures.

The processor 16a may detect a size of the respective document cell of the document cells 30 on the basis of the respective command of the commands 40 in the form of the size of the respective bounding box which may bound the printing entity of the respective command, in the following referred to as corresponding printing entity. Thus, the respective document cell of the document cells 30 may represent the corresponding printing entity.

Figure 5:
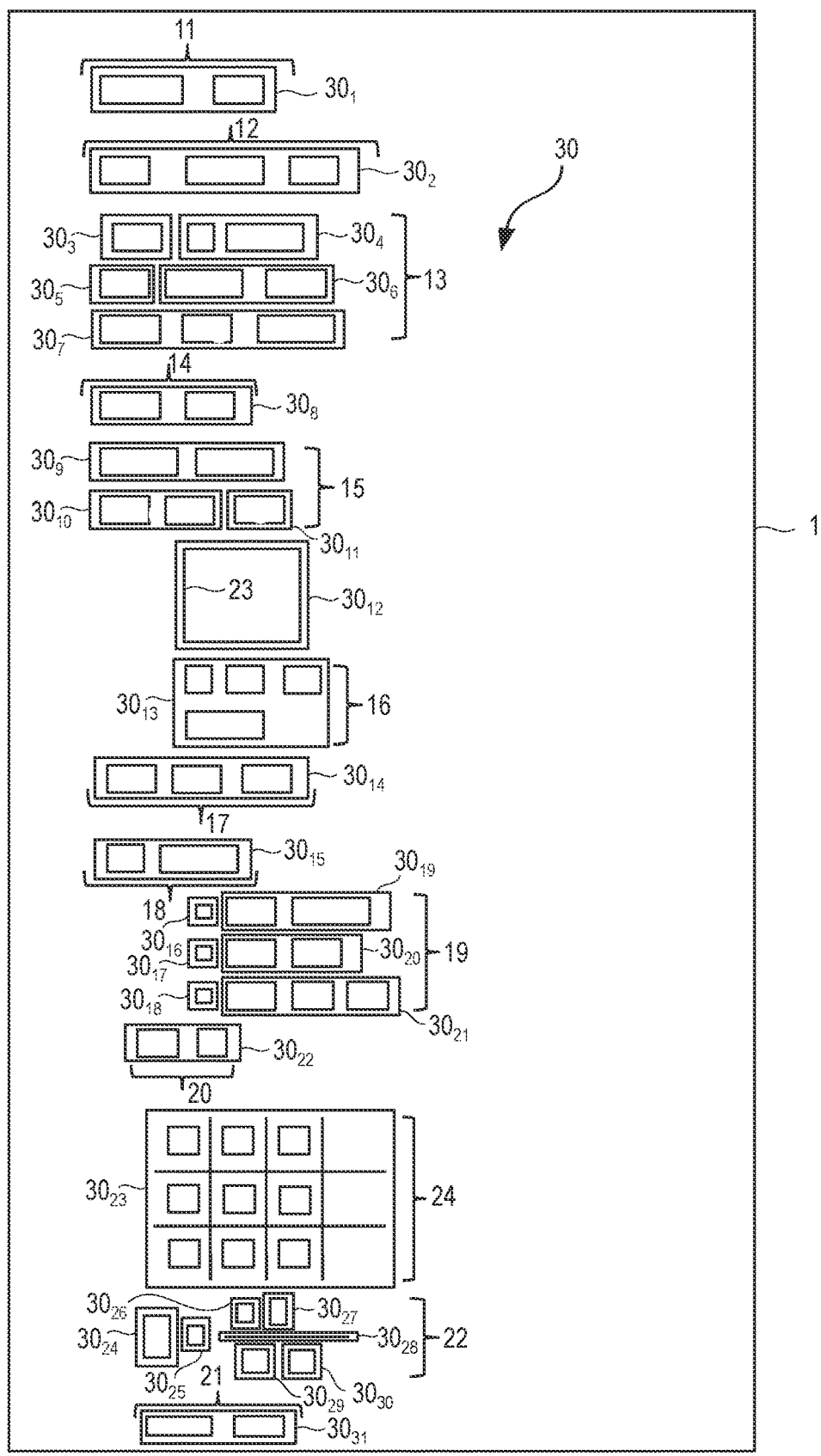
FIG. 5 depicts a block diagram schematically illustrating the elements of the PDF-document shown in FIG. 2 together with the document cells shown in FIG. 3.

A position of the respective document cell of the document cells 30 on pages of the PDF-document 1 may be given by the coordinate values of the respective command. As depicted in FIG. 5, some of the document cells 30 may bound more than one element of the elements 2. The document cells 30 may each represent that printing entity which may be comprised by the command of the commands 40.

The second operation may comprise determining parts 50 (FIG. 6) of the PDF-document 1 dependent on the PDF-document 1 by means of a machine learning module 400

Figure 7:
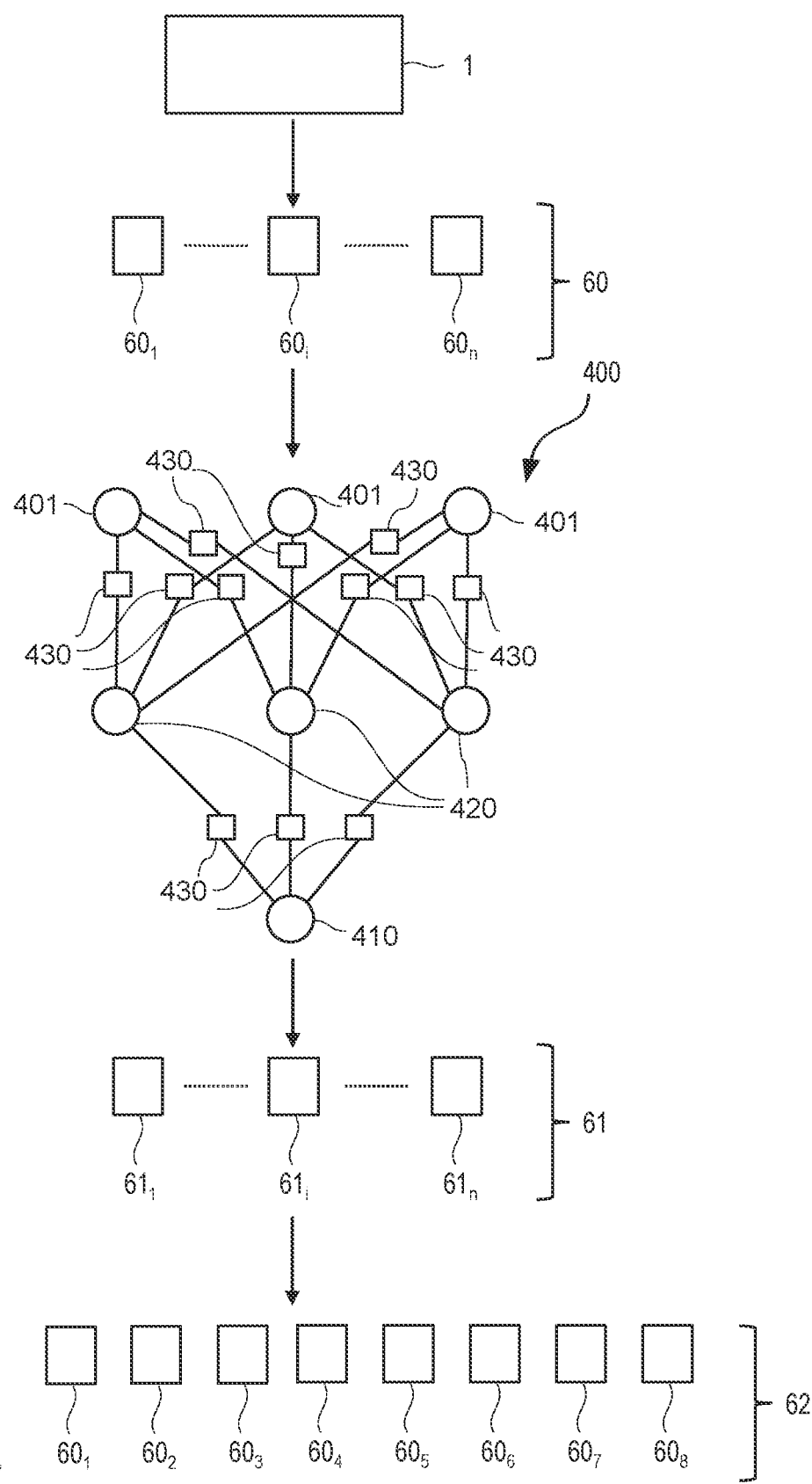
FIG. 7 depicts a block diagram schematically illustrating a generation of sets of values for specifying the parts of the PDF-document shown in FIG. 6.
Figure 9:
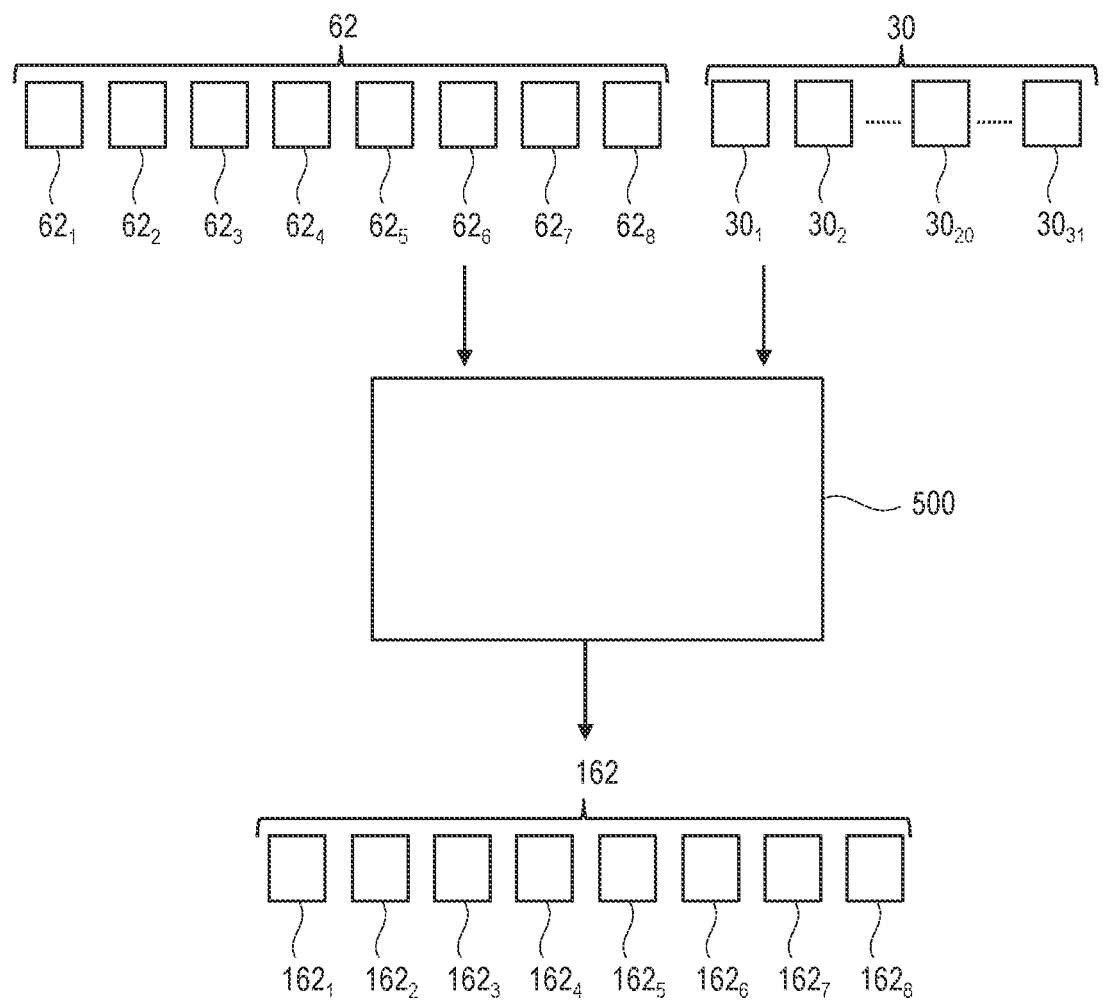
FIG. 9 depicts a block diagram schematically illustrating a symbolic artificial intelligence module for reconciling the parts of the PDF-document shown in FIG. 6 with the document cells shown in FIG. 3.

(ML-module 400) (FIG. 7). According to the example given in FIG. 7, the parts 50 may comprise a first part 51, a second part 52, a third part 53, a fourth part 54, a fifth part 55, a sixth part 56, a seventh part 57 and an eighth part 58. Each part of the parts 50 may be indicated or represented by a respective box on the pages of the PDF-document 1, as shown in FIG. 5. The respective part 51, 52, 53, 54, 55, 56, 57, 58 may be specified by a respective set of values $62_1$, $62_2$, $62_3$, $62_4$, $62_5$, $62_6$, $62_7$, $62_8$ (FIG. 9). In one example, the respective set of values $62_1$, $62_2$, $62_3$, $62_4$, $62_5$, $62_6$, $62_7$, $62_8$, specifying the respective part 51, 52, 53, 54, 55, 56, 57, 58, may comprise a position, a height and a width of the respective box which indicates the respective part 51, 52, 53, 54, 55, 56, 57, 58 and a respective label for labelling the respective part 51, 52, 53, 54, 55, 56, 57, 58.

The position of the respective box may be a position of an upper left corner of the respective box, for example. As it can be seen in FIG. 6, each part 51, 52, 53, 54, 55, 56, 57, 58 may cover a respective portion of the elements of the PDF-document 1. By that, according to one example, the respective portion of the elements of the PDF-document 1 which is covered or bounded by the respective part 51, 52, 53, 54, 55, 56, 57, 58 may be associated with the respective part 51, 52, 53, 54, 55, 56, 57, 58.

In one example, the processor 16a may assign each element of the elements 2 to one or more parts of the parts 50 dependent on the position of that document cell of the document cells 30 which bounds the printing entity which comprises the respective element of the elements 2. For example, if the position of the document cell of the document cells 30 which bounds the printing entity which comprises the respective element of the elements 2 is located within the respective box which indicates the respective part of the parts 50, then the processor 16a may assign the respective element to the respective part. Thus, this may be a further embodiment of associating the respective portion of the elements of the PDF-document 1 with one or more parts of the parts 50.

Furthermore, in one example, the respective portions of elements of the elements 2 may be associated with the respective part 51, 52, 53, 54, 55, 56, 57, 58 by determining the position, height and width of the respective box which indicates the respective part 51, 52, 53, 54, 55, 56, 57, 58. According to this example and given the example according to FIG. 6, the second text elements 12, the third text elements 13 and the fourth text elements 14 may be associated with the first part 51; the fourth text elements 14 and the fifth text elements 15 may be associated with the second part 52; the image 23 may be associated with the third part 53; the sixth text elements 16 may be associated with the fourth part 54; the seventh text elements 17 may be associated with the fifth part 55; the ninth text elements 19 may be associated with the sixth part 56; the table 24 may be associated with the seventh part 57 and the formula 22 may be associated with the eighth part 58.

FIG. 7 depicts one example how the processor 16a may generate the sets of values 62 ($62_1$, $62_2$, $62_3$, $62_4$, $62_5$, $62_6$, $62_7$, $62_8$) (FIG. 9) dependent on visualization data for visualizing the PDF-document 1 as described above. In one example, the processor 16a may generate the visualization data in the form of an image of the PDF-document 1. The image of the PDF-document 1 may be a human visible version of the complete or a part of the PDF-document 1. Furthermore, according to one example, the processor 16a may generate a set of images 60 ($60_1$, ... $60_i$, ... $60_n$) dependent on the PDF-document 1, preferably dependent on the image of the PDF-document 1. The set of images 60 may be a partition of a part of the image of the PDF-document 1 or a partition of the complete image of the PDF-document 1. In one example, the images $60_1$, ... $60_i$, ... $60_n$ may overlap each other. Each image of the set of images 60 may be represented by a respective image data file comprising pixel values for visualizing the respective image of the set of images 60.

The processor 16a may send each image $60_1$, ... $60_i$, ... $60_n$ in the form of the respective image data file to an input of the ML-module 400. The input of the ML-module 400 may comprise multiple input neurons 401. For sake of simplicity, only three of the input neurons 401 are shown in FIG. 7. In one example, the processor 16a may send each pixel value of the pixel values of one of the respective image data files to a respective input neuron of the input neurons 401. The ML-module 400 may generate a respective output datafile $61_1$, ... $61_i$, ... $61_n$ dependent on the respective image $60_1$, ... $60_i$, ... $60_n$ and dependent on values of parameters 430 of the ML-module 400. In a simple example, the respective output datafile $61_1$, ... $61_i$, ... $61_n$ may each be a respective set of values comprising a position, a height and a width of a respective box, a respective label and a respective confidence value, which are not shown in the figures. In one example, the respective confidence value may indicate a rate of accuracy of the position, height and the width of the respective box and the respective label of the respective output datafile comprising the respective confidence value.

In one example, in case the ML-module 400 is a neuronal net, the parameters 430 may be weights indicating a strength of a respective connection between one of the input neurons 401 of the ML-module 400 and one neuron of neurons 420 of a hidden lager of the ML-module 400. For sake of simplicity, only one hidden layer is depicted in FIG. 7. Furthermore, for sake of simplicity, only one output neuron 410 of the ML-module 400 is depicted. In one example, the ML-module 400 may comprise one output neuron for each value of the values of the respective datafiles 61.

In one example, the processor 16a may send the images $60_1$, ... $60_i$, ... $60_n$ one after the other to the input neurons 401 and the ML-module 400 may generate the output datafiles 61 one after the other. In another example, the ML-module 400 may be configured to process the images $60_1$, ... $60_i$, ... $60_n$ in a parallel mode and to produce the output datafiles 61 in a parallel mode, i.e. at the same time. In this example, a number of the input neurons 401 of the neurons hidden layers and of the output neurons of the ML-module 400 may be much higher.

In one example, the processor 16a may select the sets of values $62_1$, $62_2$, $62_3$, $62_4$, $62_5$, $62_6$, $62_7$, $62_8$ (FIG. 9) from the sets of the output datafiles 61 ($61_1$, ... $61_i$, ... $61_n$) such that the sets of values $62_1$, $62_2$, $62_3$, $62_4$, $62_5$, $62_6$, $62_7$, $62_8$ may be those sets of the output datafiles 61 whose confidence value is above a given confidence threshold. Thus, the parts 51, 52, 53, 54, 55, 56, 57, 58 which are determined by the processor 16a by means of the ML-module 400 according to the example given in FIG. 7 are those parts which are recognized by the ML-module 400 with a confidence which is higher than the given confidence threshold. Furthermore, the example according to FIG. 7 describes an embodiment according to which the processor 16a may perform a post-processing, in this case a selecting from the output datafiles 61, of result data produced by means of the ML-module 400, in this case the output datafiles 61, for determining the parts 51, 52, 53, 54, 55, 56, 57, 58.

The example according to FIG. 7 represents an embodiment according to which the assigning of the respective label of the parts 51, 52, 53, 54, 55, 56, 57, 58 is performed by means of the ML-module 400, in this case in the form of determining the labels of the sets of values $62_1$, $62_2$, $62_3$, $62_4$, $62_5$, $62_6$, $62_7$, $62_8$. According to another embodiment, a further ML-module, not shown in the Figures, may calculate the labels of the parts 50.

The processor 16a may perform a training of the ML-module 400 similarly to the training of the ML-module on the basis of the training datasets described above.

The third operation may comprise using a symbolic artificial intelligence module 500 (AI-module 500) (FIG. 9) of the computer system 10. The using of the symbolic AI-module 500 may comprise applying rules of the symbolic AI-module 500 for reconciling the document cells 30 with the parts 50.

Figure 6:
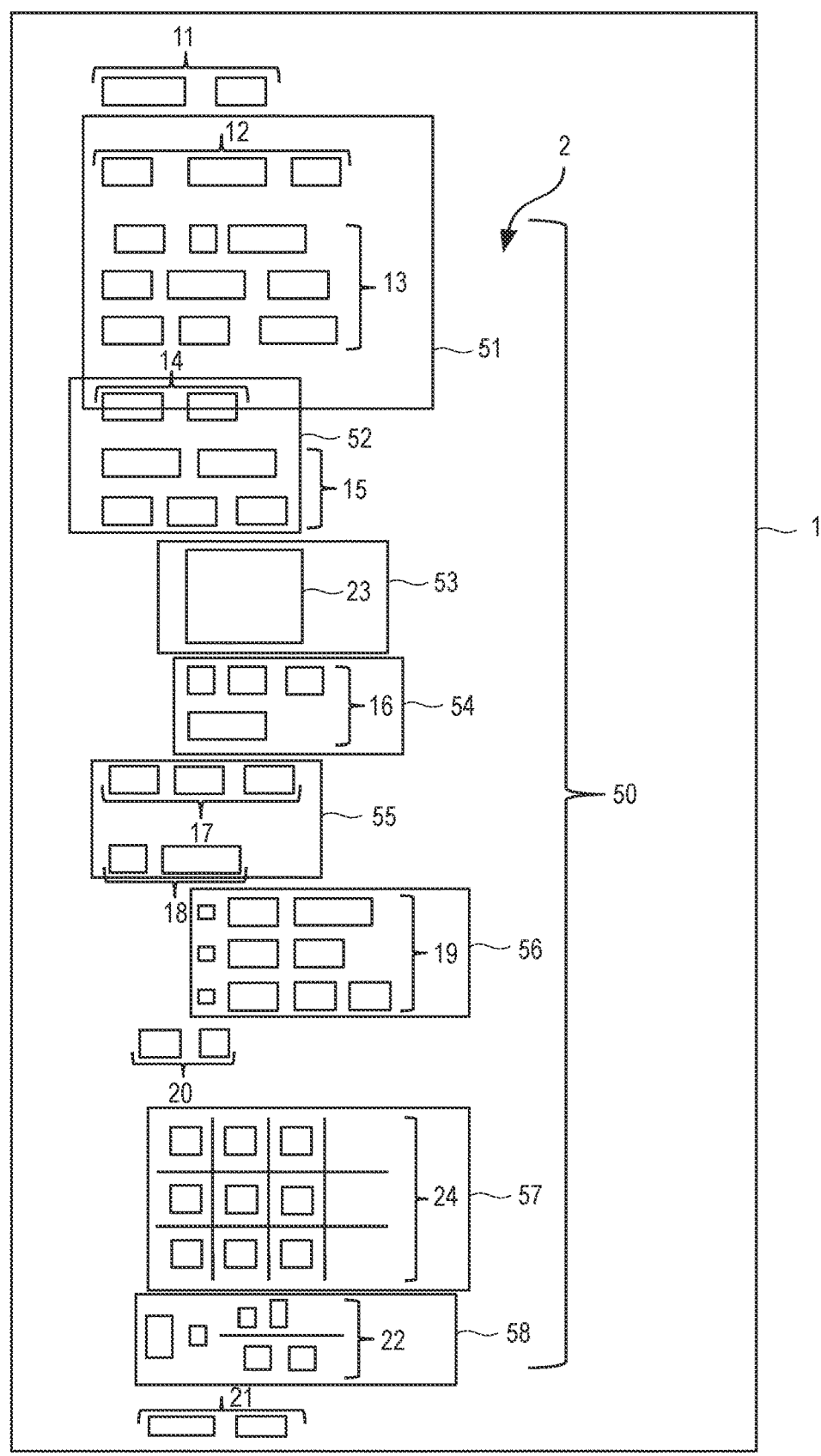
FIG. 6 depicts a block diagram schematically illustrating parts of the PDF-document shown in FIG. 2.

According to an embodiment of the example given in FIG. 6, the label of the first set of values $62_1$, that is the label of the first part 51, may be "text paragraph". The label of the second set of values $62_2$, that is the label of the second part 52, may be "text paragraph". The label of the third set of values $62_3$, that is the label of the third part 53, may be "image". The label of the fourth set of values $62_4$, that is the label of the fourth part 54, may be "text paragraph". The label of the fifth set of values $62_5$, that is the label of the fifth part 55, may be "text paragraph". The label of the sixth set of values $62_6$, that is the label of the sixth part 56, may be "text paragraph". The label of the seventh set of values $62_7$, that is the label of the seventh part 57, may be "table". The label of the eighth set of values $62_8$, that is the label of the eighth part 58, may be "text paragraph". The aforementioned labels of the parts 51 to 58 may represent the labels of the parts 50 according to the result data of the ML-module 400.

Figure 8:
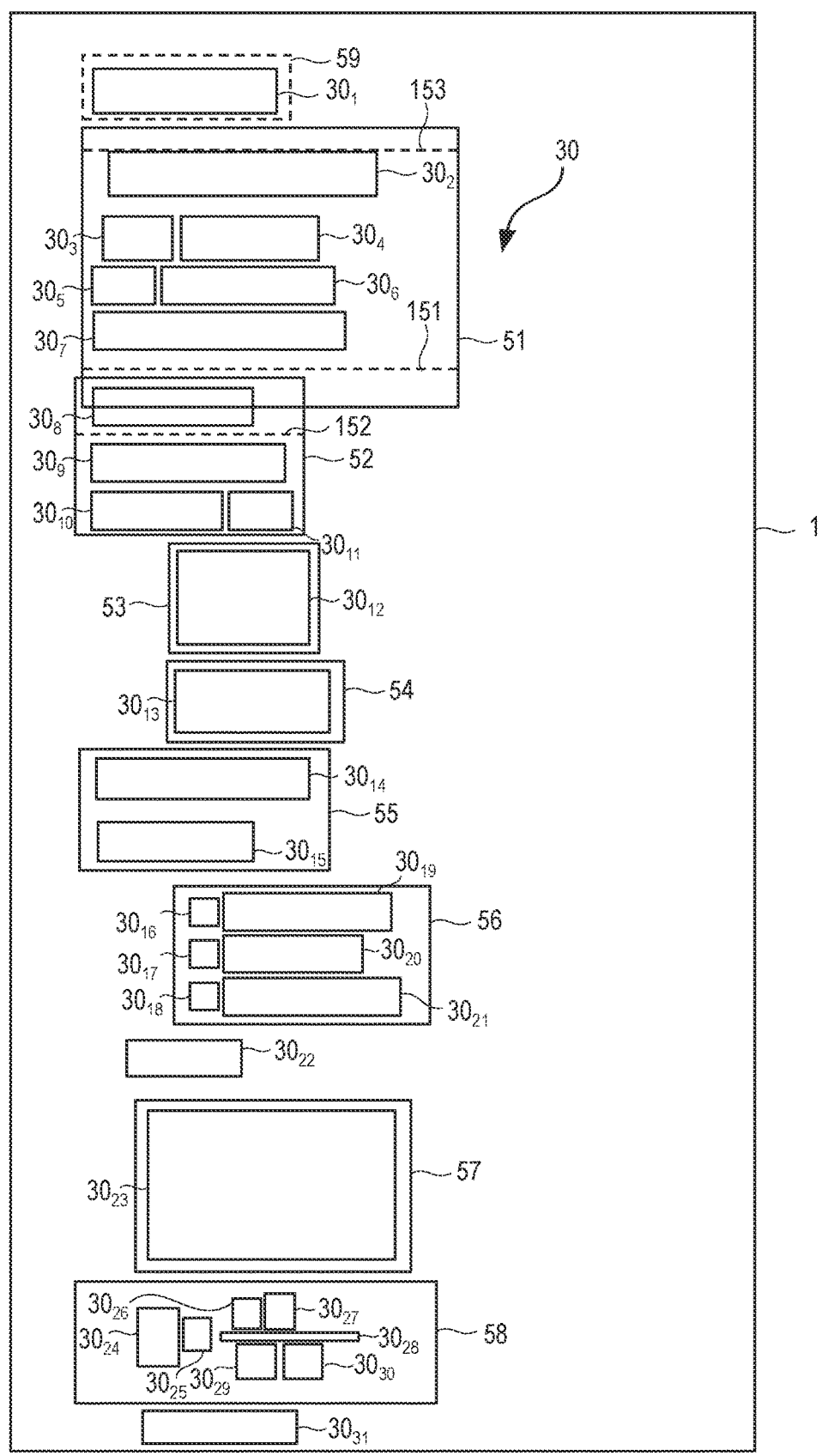
FIG. 8 depicts a block diagram schematically illustrating an adaptation of the parts of the PDF-document shown in FIG. 6 to the document cells shown in FIG. 3.

The parts 50 together with the document cells 30 are shown in FIG. 8.

The rules of the symbolic AI-module 500, in the following also referred to as AI-module 500, for reconciling the document cells 30 with the parts 50 may comprise various sets of rules, for example a first set of rules, which are described in the following.

The first set of rules may resolve the problem of overlapping parts. According to a first rule of the first set, each element of the elements 2 should only be associated with only one part of the parts 50. Referring to the fourth text elements 14, which may be represented by the eighth document cell $30_8$ (FIG. 8), these elements are bounded by the first part 51 and the second part 52 according to the result data of the ML-module 400. This twofold association of the fourth text elements 14 may be resolved by reconciling the position of the document cells 30 with the positions of the parts 50.

In one example, the AI-module 500 may calculate respective values of overlap for a document cell of the document cells 30 which is overlapped by at least two parts of the parts 50, in the following also referred to as overlapped cell. The parts of the parts 50 which overlap the overlapped cell may be referred to as overlapping parts in the following. The respective value of overlap may be a value for the respective overlapping part indicating a respective percentage of coverage of the overlapped cell by the respective overlapping part.

According to a second rule of the first set, the AI-module 500 may adapt the size of that part of the overlapping parts which has the highest value of overlap with respect to the overlapped cell such that the respective part bounds the overlapped cell completely. In one example, the AI-module 500 may perform such an adaptation of this part only if the value of overlap exceeds a given overlap threshold, for example 50 percent.

According to a third rule of the first set, the AI-module 500 may adapt the size of the respective part of the overlapping parts which has the lowest value of overlap with respect to the overlapped cell such that the respective part does not overlap the overlapped cell at all.

Referring to eighth document cell $30_8$, the value of overlap for the eighth document cell $30_8$ with respect to the first part 51 may be 50 percent and the value of overlap for the eighth document cell $30_8$ with respect to the second part 52 may be 100 percent. Hence, according to the third rule of the first set, the AI-module 500 may cut the first part 51 such that it does not cover eighth document cell $30_8$. A new lower limit of the first part 51 may be indicated by a first dashed line 151.

In one example, the respective elements of the elements 2 which may be comprised by the printing entity which is represented by the overlapped cell may be assigned to that part of the overlapping parts which has the highest value of overlap with respect to the overlapped cell. Thus, referring to the example, the processor 16a may assign the fourth text elements 14 to the second part 52.

According to a fourth rule of the first set, the AI-module 500 may adapt the sizes of the parts of the overlapping parts to the sizes of the document cells 30 such that the overlapped cell, in this case the eighth document cell $30_8$, may be covered by only that part of the overlapping parts which covers the most document cells, in this case the first part 51. In this case and according to the fourth rule, the AI-module 500 may cut the second part 52 such that an upper limit of the second part 52 may be indicated by a second dashed line 152. Following the fourth rule, the processor 16a may assign the fourth text elements 14 to the first part 51.

According to a fifth rule of the first set, the AI-module 500 may adapt the sizes of the overlapping parts to the sizes of the document cells 30 such that the overlapped cell is bounded only by that part of the overlapping parts which is ranked the higher according to an order of the parts 50. A ranking of the parts 50 may start from the top of the PDF-document 1 with the first part 51 being the highest ranked part and may successively decrease for the parts located further down in the PDF-document 1. For example, the first part 51 may be ranked higher than the second part 52. Thus, according to the fifth rule of the first set, the AI-module 500 may cut the second part 52 such that an upper limit of the second part 52 may be indicated by the second dashed line 152. Following the fifth rule, the processor 16a may assign the fourth text elements 14 to the first part 51.

According to a sixth rule of the first set, the AI-module 500 may adapt the sizes of the parts of the overlapping parts to the sizes of the document cells 30 such that the overlapped cell is bounded only by that part which is the greater one of the parts of the overlapping parts.

In one example, the AI-module 500 may execute the reconciliation of the parts 50 with the document cells 30 following an order of rules of the first set of rules. For example, the AI-module 500 may first reconcile the parts 50 with the document cells 30 according to the second rule of the first set of rules. If an adaption of the parts 50 may not be applicable, for example, in case there is no value of overlap which exceeds the given overlap threshold, then the AI-module 500 may reconcile the parts 50 with the document cells 30 according to the fourth rule of the first set of rules.

According to a second set of rules of the AI-module 500, the AI-module 500 may adapt the sizes of the parts 50 to the sizes of the document cells 30 such that a number of document cells which are not overlapped by at least one of the parts 50, in the following also referred to as orphan cells, may be reduced. Referring to FIG. 8, the first document cell 30$_1$ and the thirty-first document cell 30$_{31}$ may be orphan cells. In order to reduce the number of orphan cells, the AI-module 500 may create further parts, for example a first further part 59 indicated in dashed lines in FIG. 8. The processor 16*a* may compare the positions of the document cells 30 with the positions of the parts given by the sets 61 in order to detect the orphan cells.

As described above, an order of the document cells 30 may be provided by an order of the commands 40 within the text file 41. The parser module 71 may store the order of the document cells 30 in the RAM 130, for example in the form of an array.

In one example, the AI-module 500 may group a part of the orphan cells to one orphan cluster if the orphan cells of this part may follow directly one after the other according to the order of the document cells 30. Such orphan cells may build an orphan sequence according to the order of the document cells 30. Furthermore, the AI-module 500 may assign the elements of the elements 2 which may be comprised by the printing entities which are represented by the orphan cells of the orphan cluster to one of the further parts, for example the first further part 59.

According to one example, the AI-module 500 may group the part of the orphan cells to one orphan cluster only if the resulting orphan cluster may not overlap one of the parts 50. Furthermore, the AI-module 500 may group the part of the orphan cells to one orphan cluster only if the resulting orphan cluster may not overlap with one of the orphan cells which is not part of the orphan sequence. This may prevent that the first document cell 30$_1$ and the thirty-first document cell 30$_{31}$ may form the orphan cluster in case they follow directly one after the other within the order of the document cells 30. The latter case may occur depending on the PDF-document 1 and the parser module 71.

Furthermore, the AI-module 500 may group the part of the orphan cells to one orphan cluster only if the resulting orphan cluster may not overlap with a document cell which may represent a printing entity which comprises an image. According to a further rule of the second set of rules, the AI-module 500 may group the part of the orphan cells to one orphan cluster only if respective vertical distances between the orphan cells of the resulting orphan cluster may not exceed a prescribed vertical distance.

A third set of rules of the AI-module 500 may provide rules for cutting the parts 50. In one example, the AI-module 500 may perform a cutting of the parts 50 such that the parts 50 cover less area or the minimal area for bounding the respective portion of elements they are associated with. In order to detect a limit up to which extent the parts 50 may be cut, the sizes and positions of the parts 50 may be reconciled with the sizes and positions of the document cells 30. For example, the AI-module 500 may perform a comparison of positions of edges of the boxes which indicate the parts 50 with positions of edges of the document cells 30. Furthermore, the AI-module 500 may adapt the position of at least one edge of at least one box of the boxes which indicate the parts 50 to the position of at least one edge of the document cells 30.

For example, the AI-module 500 may cut one part of the parts 50, such as the first part 51, such that an upper boundary of the first part 51 is shifted down towards an upper boundary of the document cell that is furthest up of the document cells which are covered by this part, such as the second document cell 30$_2$. In this example, the AI-module 500 may shift the upper boundary of the first part 51 to a position of a third dashed line 153.

In most cases, the AI-module 500 may modify at least one value of at least one set of values of the set of values 62$_1$, 62$_2$, 62$_3$, 62$_4$, 62$_5$, 62$_6$, 62$_7$, 62$_8$ in the process of reconciling the parts 50 with the document cells 30 resulting in a modified version of these sets. For example, in order to shift the upper boundary of the first part 51 to the position of the third dashed line 153, the AI-module 500 may modify the value of the first set of values 62$_1$ which indicates a vertical position of the upper boundary of the box which indicates the first part 51. The AI-module 500 may output the respective modified version of the set of values 62$_1$, 62$_2$, 62$_3$, 62$_4$, 62$_5$, 62$_6$, 62$_7$, 62$_8$, in the following also referred to as respective modified set of values 162$_1$, 162$_2$, 162$_3$, 162$_4$, 162$_5$, 162$_6$, 162$_7$, 162$_8$ or modified sets of values 162, as depicted in FIG. 9.

In one example, the document cells 30 may comprise document cells for indicating grid lines of the table 24, in the following also referred as grid line cells. The grid line cells may each represent a printing entity for printing a respective grid line of the table 24. The grid line cells are not shown in the Figures for sake of simplicity. The AI-module 500 may cut a part of the parts 50 which may represent a table, for example the seventh part 57, such that an upper boundary of this part is shifted down towards an upper boundary of one of the grid line cells.

According to a further example, the AI-module 500 may merge document cells of the document cells 30 which may each represent a respective printing entity for printing a respective image, in the following also referred to as image cells. The AI-module 500 may perform a merging of the image cells if the image cells overlap each other. In one example, the AI-module 500 may perform a merging of the image cells if an overlapping of the image cells exceeds a given image overlap threshold. In one example, the image overlap threshold may be ten percent. In response to the merging of the image cells, the AI-module 500 may merge the parts of the parts 50 which may cover the merged image cells.

The processor 16*a* may perform a reassignment of the elements 2 to the parts 50 in response to the reconciling of the parts 50 with the document cells 30. The respective modified set of values 162$_1$, 162$_2$, 162$_3$, 162$_4$, 162$_5$, 162$_6$, 162$_7$, 162$_8$ (FIG. 9) may comprise a modified size of the box which indicates the respective part 51, 52, 53, 54, 55, 56, 57, 58. The modified sizes of these boxes may provoke that some elements of the elements 2 may be covered by a different part of the parts 50 compared to a situation before the reconciling. In the following, the respective parts of the parts 50 which are indicated by the respective modified size of the respective box are referred to as modified parts.

The reassignment of the elements 2 may involve that the processor 16*a* may assign each element of the elements 2 to one or more of the modified parts dependent on the position of that document cell of the document cells 30, which bounds the printing entity which comprises the respective element of the elements 2, and dependent on the modified sizes of the boxes indicating the modified parts. For example, if the position of the document cell of the document cells 30 which bounds the printing entity which comprises the respective element of the elements 2 is located within the respective box which indicates the respective modified part of the parts 50, then the processor 16*a* may assign the respective element to the respective modified part.

In one example, the processor 16*a* may assign an identification number to each element of the elements 2 dependent on the printing entities of the commands 40. In one example, the processor 16*a* may perform the assignment of the elements 2 to the parts 50 as mentioned above using the identification numbers of the elements 2 resulting in a respective element membership information for each part of the parts 50. Analogously, the processor 16*a* may perform the reassignment of the elements 2 to the parts 50 as described above using the identification numbers of the elements 2 resulting in a respective modified element membership information for each part of the parts 50.

The fourth operation may comprise generating and labelling elements of the structure 1000 of the PDF-document 1 dependent on a result of the reconciling of the parts 50 with the document cells 30 and dependent on the labels of the parts 50. According to one example, the AI-module 500 may be configured for generating and labelling elements of the structure 1000 of the PDF-document 1 dependent on the result of the reconciling of the parts 50 with the document cells 30 and dependent on the labels of the parts 50. In a simple example according to FIG. 10, the structure 1000 may comprise a head 1001 and first set of elements 1100. The head 1001 may describe a name and/or a type of the structure 1000. The elements of the first set of elements 1100 ($1100_1$, $1100_2$, $1100_3$, $1100_4$, $1100_5$, $1100_6$, $1100_7$, $1100_8$) may each branch off from the head 1001 and may comprise an information about the label of one respective part 51, 52, 53, 54, 55, 56, 57, 58 of the parts 50. Furthermore, the structure 1000 may comprise a second set of elements 1200. The elements of the second set of elements 1200 ($1200_1$, $1200_2$, $1200_3$, $1200_4$, $1200_5$, $1200_6$, $1200_7$, $1200_8$) may each comprise an information about which portions of the elements of the elements 2 are assigned to the respective part 51, 52, 53, 54, 55, 56, 57, 58 after the reconciling, that is the respective modified element membership information of the respective part 51, 52, 53, 54, 55, 56, 57, 58. In another example, the structure 1000 may be a data structure which comprises a part of or the complete modified set of values $162_1$, $162_2$, $162_3$, $162_4$, $162_5$, $162_6$, $162_7$, $162_8$. In addition, the structure 1000 may comprise the respective modified element membership information of the respective part 51, 52, 53, 54, 55, 56, 57, 58.

In one example, the processor 16*a* may determine further parts 80 (FIG. 11) of the PDF-document 1 dependent on the document cells 30. According to the example given in FIG. 11, the further parts 80 may comprise a first further part 81, a second further part 82, a third further part 83, a fourth further part 84, a fifth further part 85, a sixth further part 86, a seventh further part 87, an eighth further part 88, a ninth further part 89 and tenth further part 90.

Figure 11:
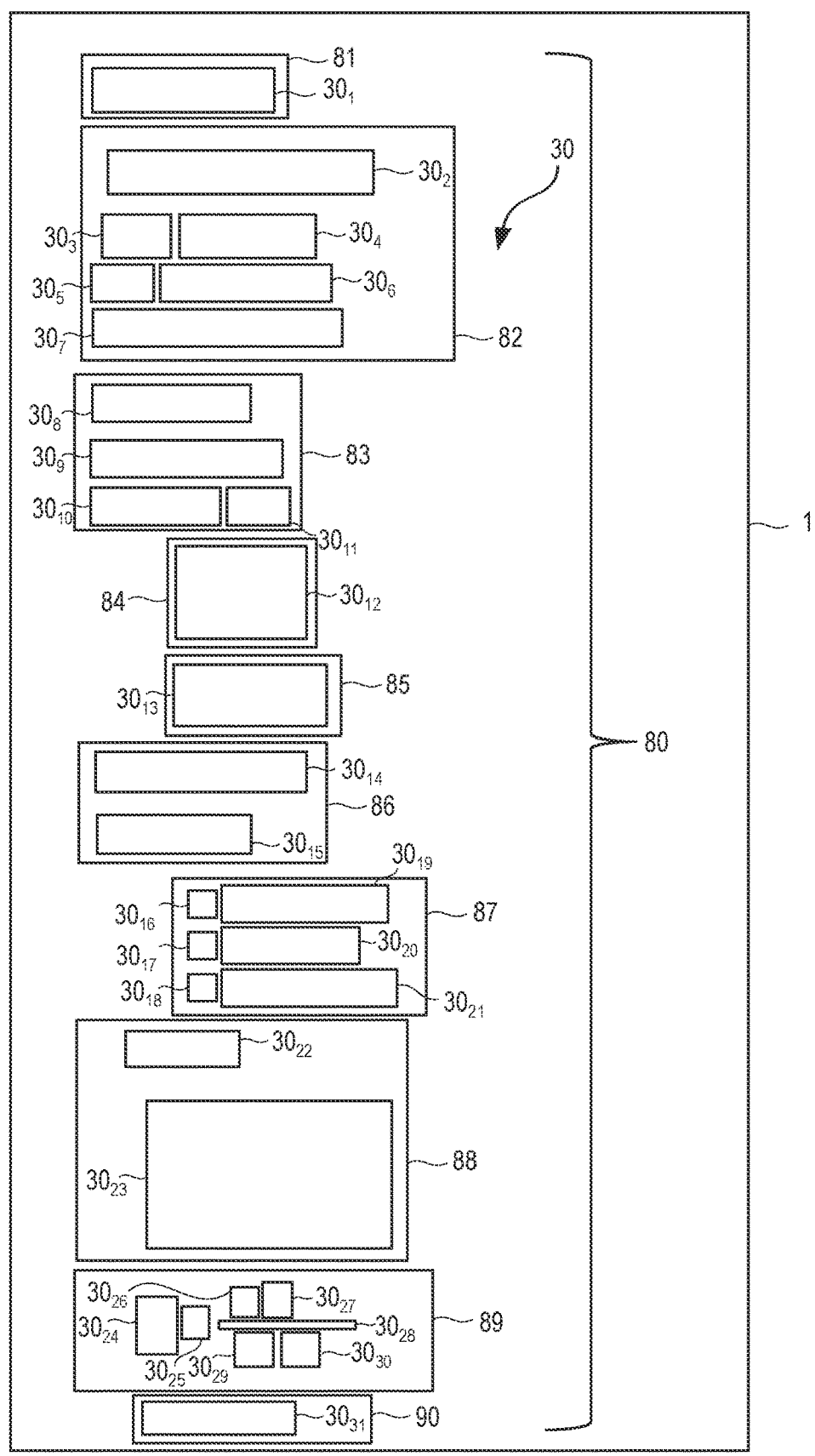
FIG. 11 depicts a block diagram schematically illustrating further parts of the PDF-document shown in FIG. 2.
Figure 12:
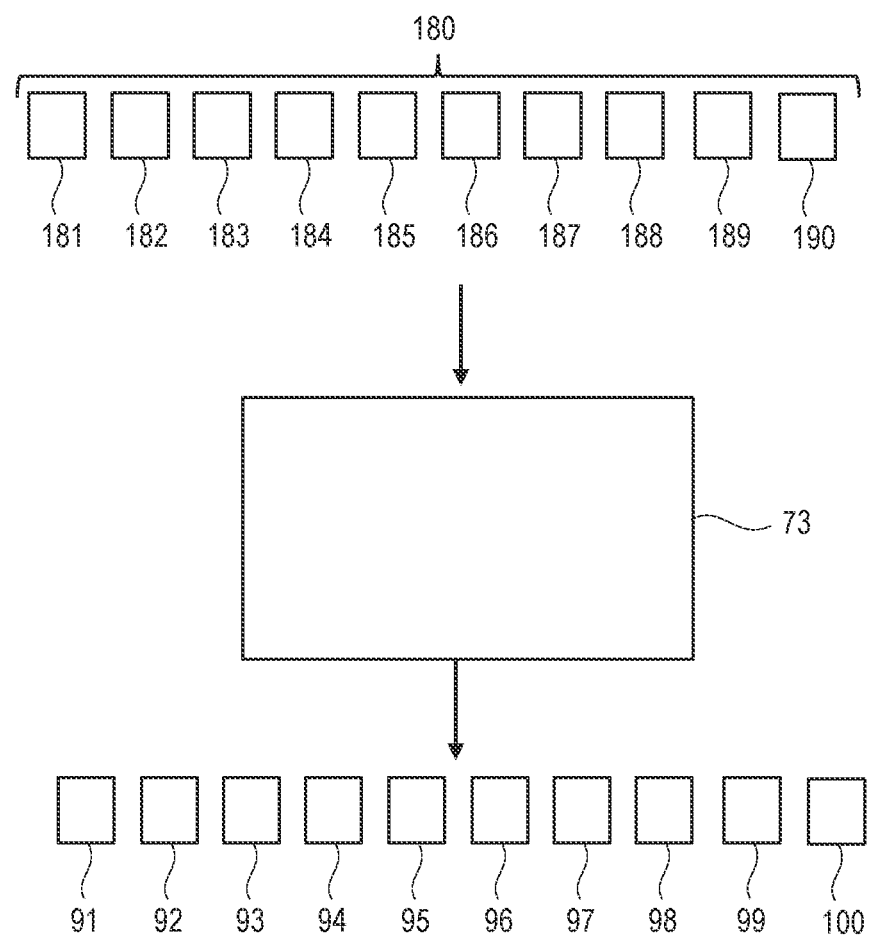
FIG. 12 depicts a block diagram schematically illustrating a sequence-based artificial intelligence module.

Each further part of the further parts 80 may be indicated or represented by a respective box on the pages of the PDF-document 1, as shown in FIG. 11. The respective further part 81, 82, 83, 84, 85, 86, 87, 88, 89, 90 may be specified by a respective further set of values 91, 92, 93, 94, 95, 96, 97, 98, 99, 100 (FIG. 12). In one example, the respective further set of values 91, 92, 93, 94, 95, 96, 97, 98, 99, 100 may comprise a respective label for labelling the respective further part 81, 82, 83, 84, 85, 86, 87, 88, 89, 90.

The label of a first further set of values 91 corresponding to the first further part 81 may be "heading line". The label of a second further set of values 92 corresponding to the second further part 82 may be "text paragraph".

The label of a third further set of values 93 corresponding to the third further part 83 may be "text paragraph". The label of a fourth further set of values 94 corresponding to the fourth further part 84 may be "image". The label of a fifth further set of values 95 corresponding to the fifth further part 85 may be "caption". The label of a sixth further set of values 96 corresponding to the sixth further part 86 may be "text paragraph". The label of a seventh further set of values 97 corresponding to the seventh further part 87 may be "list". The label of an eighth further set of values 98 corresponding to the eighth further part 88 may be "table". The label of a ninth further set of values 99 corresponding to the ninth further part 89 may be "formula". The label of a tenth further set of values 100 corresponding to the tenth further part 90 may be "page footer".

In one example, the computer system 10 may determine the further parts 80 by means of a further ML-module 73 (FIG. 1) dependent on sequences 180, as depicted in FIG. 12. The processor 16*a* may create the sequences 180 dependent on characters provided by the commands 40, for example, dependent on features of the commands 40. The features of the commands 40 may be the features of the commands described above. The processor 16*a* may extract the features of the commands 40 on the basis of the printing entities which are comprised by commands 40. The sequences may form single words, phrases, sentences and/or paragraphs of several sentences. The further ML-module 73 may generate the respective further set of values 91, 92, 93, 94, 95, 96, 97, 98, 99, 100 each dependent on a first sequence 181, a second sequence 182, a third sequence 183, a fourth sequence 184, a fifth sequence 185, a sixth sequence 186, a seventh sequence 187, an eighth sequence 188, a ninth sequence 189 and a tenth sequence 190, respectively. The further ML-module 73 may comprise the transformer module. Using the further ML-module 73 for determining the labels of the further parts 80 may comprise using the pretrained module BERT, in one example.

Figure 13:
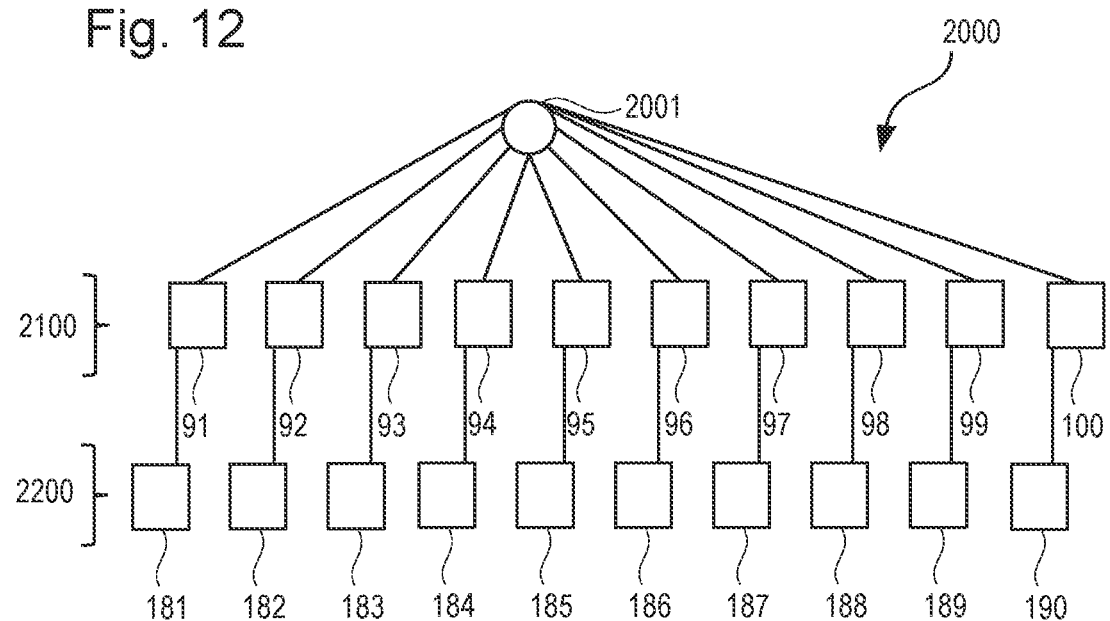
FIG. 13 depicts a block diagram schematically illustrating a further structure of the PDF-document shown in FIG. 2 generated by means of the sequence-based artificial intelligence module shown in FIG. 12.

According to one example, the processor 16*a* may generate a further structure of the PDF-document 1 on the basis of the further parts 80, in the following referred to as further structure 2000 (FIG. 13). In a simple example according to FIG. 13, the further structure 2000 may comprise a head 2001 and first set of elements 2100. The head 2001 may describe a name and/or a type of the further structure 2000. The elements of the first set of elements 2100 may each branch off from the head 2001 and may comprise the label of the respective further part 81, 82, 83, 84, 85, 86, 87, 88, 89, 90, thus the respective further set of values 91, 92, 93, 94, 95, 96, 97, 98, 99, 100. Furthermore, the further structure 2000 may comprise a second set of elements 2200. The elements of the second set of elements 2200 may each comprise the respective sequence 181, 182, 183, 184, 185, 186, 187, 188, 189, 190 corresponding to the respective further part 81, 82, 83, 84, 85, 86, 87, 88, 89, 90.

In some applications, the further ML-module 73 may generate one or more labels for the orphan cells described above. This may be realized as follows. For example, one of the sequences, for example a first sequence 181, may comprise a printing entity and features of a command of the commands 40 for printing the first text elements 11, that is the heading line, in the following also referred to as heading line sequence. The processor 16*a* may generate the heading line sequence by parsing the first document cell $30_1$ by means of the parser module 71. In one example, the further ML-module 73 may generate the label "heading line" as output data when processing the heading line sequence as input data.

In one example, the computer system 10 may be configured for reconciling the labels of the parts 50 with the labels of the further parts 80 by means of the AI-module 500. In the following, rules of the AI-module 500 for reconciling the labels of the parts 50 with the labels of the further parts 80, also referred to as rules for label reconciling, may be described.

A first rule of the rules for label reconciling may be designed such that one or more elements of the elements 2 which is or are not assigned to any part of the parts 50 (orphan element or orphan elements), such as the first text elements 11, may be labelled on the basis of at least one label of the further parts 80. In one example, the processor 16a may label the orphan element with the label of the part of the further parts 80 which covers the document cell which represents that printing entity which comprises the orphan element. For example, the processor 16a may label the first text elements 11 with the label "heading line". In another example, the processor 16a may label the eleventh text elements 21 with the label "page footer".

A second rule of the rules for label reconciling may be designed such that the processor 16a may label one part of the parts 50 as "formula" if at least one of the further parts 80 is labelled as "formula" and covers a document cell of the document cells 30 which represents a printing entity which comprises at least one element of that part of the parts 50. This rule may use an observation that the trained sequence based further ML-module 73 is configured to recognize formulas with a higher accuracy than the ML-module 400. Hence, the labels of the parts 50 may be overwritten by a label of one of the further parts 80 according to this example.

The processor 16a may correct a label of the modified set of values $162_1$, $162_2$, $162_3$, $162_4$, $162_5$, $162_6$, $162_7$, $162_8$ in response to a correction of that label according to the first or second rule of the rules for label reconciling. Furthermore, the processor 16a may correct the structure 1000 such that this correction is incorporated in the structure 1000.

Figure 14:
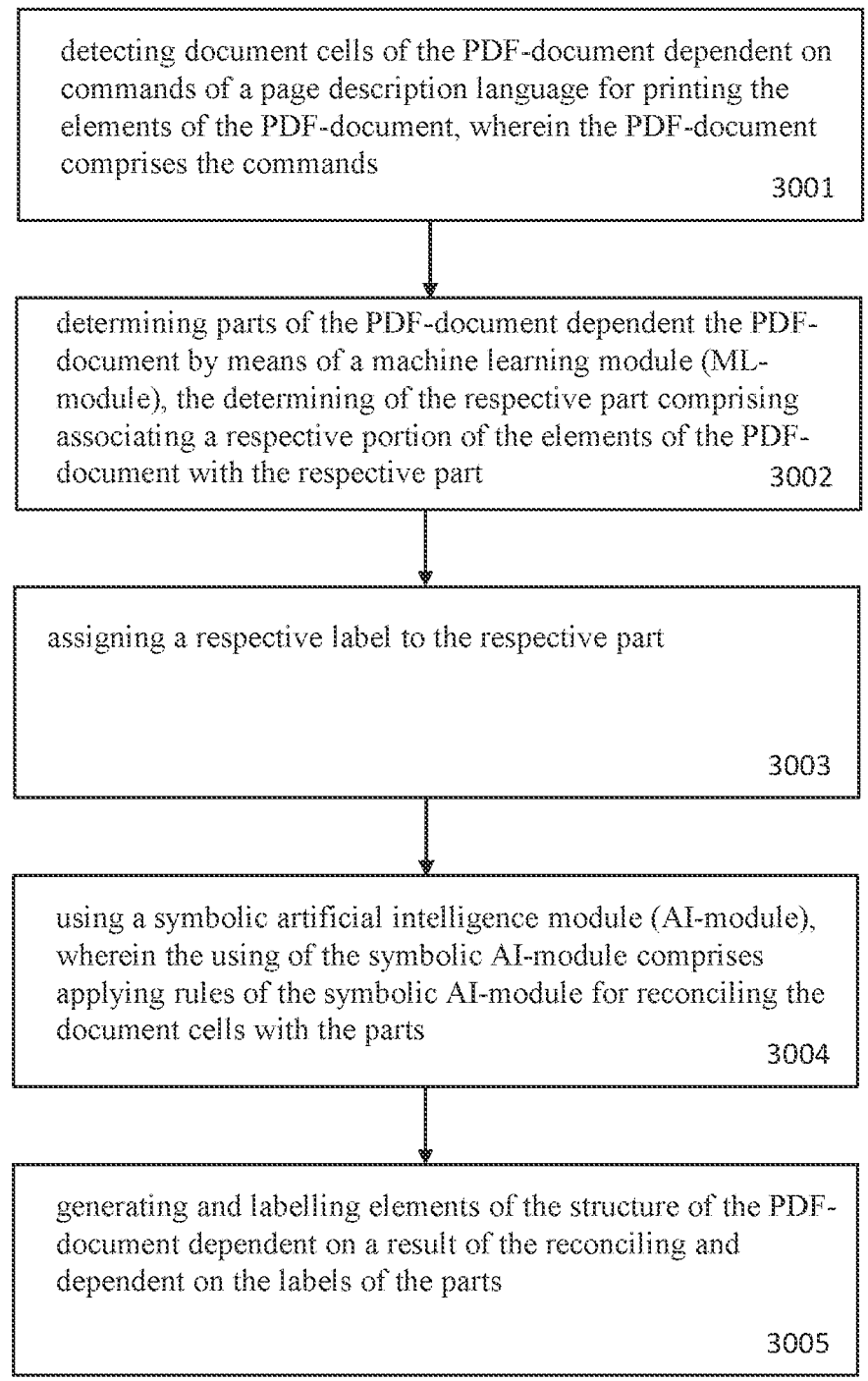
FIG. 14 depicts a flowchart of a method for generating the structure of the PDF-document shown in FIG. 10.

FIG. 14 shows a flowchart of a computer-implemented method for generating a structure, such as the structure 1000, of a PDF-document, such as the PDF-document 1.

In step 3001, document cells, such as the document cells 30, of the PDF-document 1 may be detected dependent on commands, such as the commands 40, of the page description language for printing the elements 2 of the PDF-document 1. As described above, the PDF-document 1 may comprise the commands 40.

In step 3002, the parts 50 of the PDF-document 1 may be determined dependent on the PDF-document 1 by means of the machine learning module 400. The determining of the respective part 51, 52, 53, 54, 55, 56, 57, 58 may comprise associating the respective portion of the elements 2 of the PDF-document 1 with the respective part 51, 52, 53, 54, 55, 56, 57, 58.

In step 3003, the respective label may be assigned to the respective part 51, 52, 53, 54, 55, 56, 57, 58, for example, by means of the ML-module 400. According to this example, the respective part 51, 52, 53, 54, 55, 56, 57, 58 may be specified by the respective set of values $62_1$, $62_2$, $62_3$, $62_4$, $62_5$, $62_6$, $62_7$, $62_8$, wherein each set comprises the label of the respective part 51, 52, 53, 54, 55, 56, 57, 58.

In step 3004, the symbolic artificial intelligence module 500 may be used, wherein a using of the symbolic AI-module 500 may comprise applying rules of the symbolic AI-module 500 for reconciling the document cells 30 with the parts 50.

In step 3005, the elements of the structure 1000 of the PDF-document 1 may be generated and labelled dependent on a result of the reconciling of the document cells 30 with the parts 50 and dependent on the labels of the parts 50.

Figure 15:
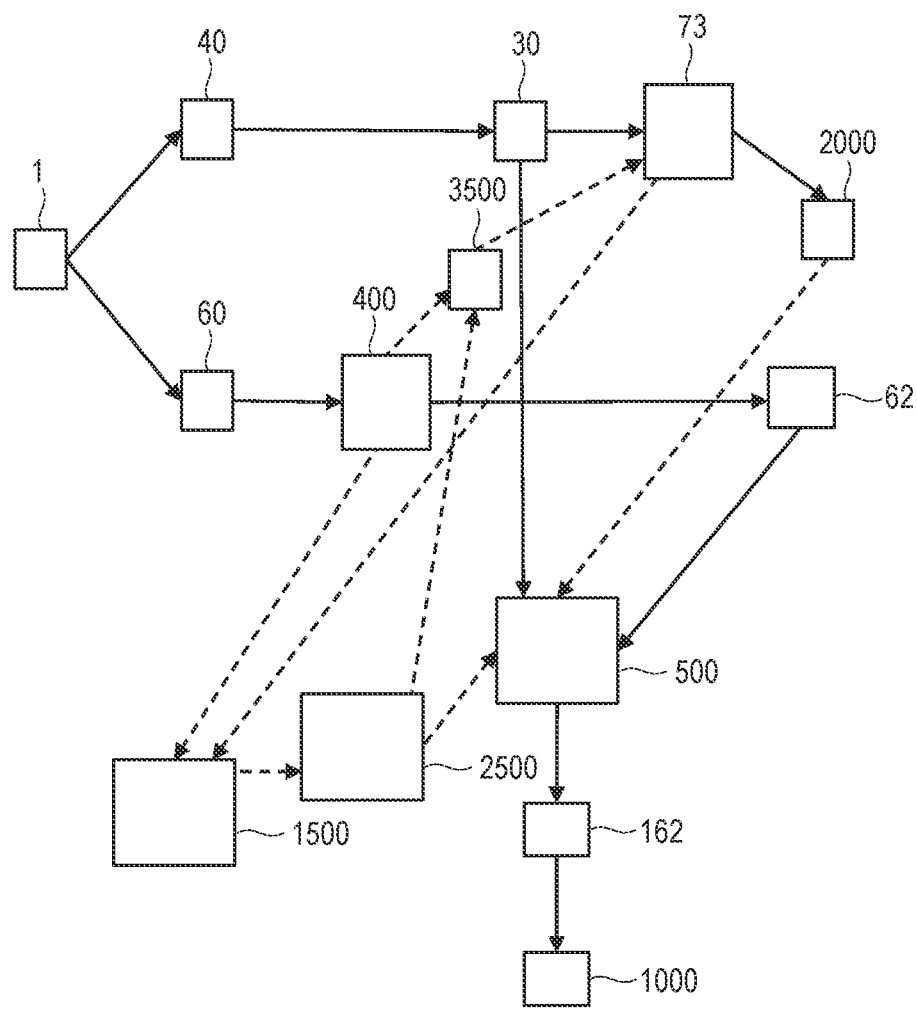
FIG. 15 depicts a block diagram schematically illustrating a further variant of the method for generating the structure of the PDF-document shown in FIG. 14.

FIG. 15 shows a flowchart of another embodiment of the method for generating the structure of the PDF-document 1 depicted in FIG. 14. The flowchart depicted in FIG. 15 may visualize some of the processes of the computer system 10 described above. Starting from the PDF-document 1, the processor 16a may generate the visualization data for visualizing the PDF-document 1, for example, in the form of the set of images 60 ($60_1$, . . . $60_i$, . . . $60_n$), dependent on the PDF-document 1. The ML-module 400 may generate the sets of values 62 dependent on the visualization data. The sets of values 62 may be considered as an image-based proposal for the structure 1000.

Furthermore, also starting from the PDF-document 1, the processor 16a may generate the commands 40, preferably in a human readable format, for example, by means of the parser module 71 or by means of optical character recognition. The processor 16a may detect boundaries of the printing entities in the form of the document cells 30 on the basis of the commands 40. The AI-module 500 may calculate the modified sets of values 162 dependent on the document cells 30 and the sets of values 62. The processor 16a may generate the structure 1000 on the basis of the modified sets of values 162. According to a further example, the AI-module 500 may calculate the modified sets of values 162 dependent on the further structure 2000 and the sets of values 62. In another embodiment of this example, the AI-module 500 may calculate the modified sets of values 162 dependent on the further structure 2000, the document cells 30 and the sets of values 62.

The dashed lines in FIG. 15 visualize a further embodiment of the method. According to this embodiment, results of the ML-module 400, for example, the sets of values 62, and results of the further ML-module 73 may be stored in a data container 1500. The results stored in the data container 1500 may be reviewed by a human, preferably in consideration with the document 1. By reviewing the results, the training data set for adapting the rules of the AI-module 500 as described above may be gathered. The training data set may comprise the results of the ML-module 400 and/or the results of the further ML-module 73. In one example, the training data set may comprise the training labels and the training PDF-documents as described above. In one example, a rule adaption module 2500 may adapt the rules of the AI-module 500 dependent on the training data set.

In one example, the results of the ML-module 400, for example, the sets of values 62, may be processed by means of a further symbolic artificial intelligence module 3500 (further AI-module) resulting in further input data for the further ML-module 73. The further input data may comprise the labels of the sets of values 62 which are determined by means of the AI-module 400 with a confidence which exceeds a further confidence threshold, indications of a beginning of one or more parts of the parts 50 and/or indications of an end of one or more parts of the parts 50. According to this example, the further ML-module 73 may compute the respective further set of values 91, 92, 93, 94, 95, 96, 97, 98, 99, 100 dependent on the sequences 180 and the further input data for the further ML-module 73. In one example, the further input data for the further ML-module 73 may be integrated in the sequences 180. In one example, the rule adaption module 2500 may adapt the rules of the further AI-module 3500 dependent on the training data set.

An optimization of the further AI-module 3500, the further ML-module 73 and the AI-module 500 may be performed in that given order; firstly the further AI-module 3500, secondly the further ML-module 73 and thirdly the AI-module 500.

Figure 16:
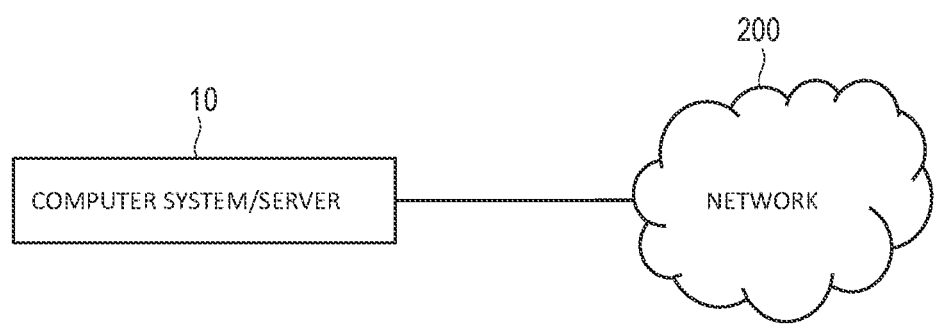
FIG. 16 depicts a block diagram schematically illustrating the computer system shown in FIG. 1 and a network.

FIG. 16 shows an exemplary computing environment where a computer system such as computer system 10 is connected, e.g., using the network adapter 120, to a network 200. Without limitation, the network 200 may be a communications network such as the internet, a local-area network (LAN), a wireless network such as a mobile communications network, and the like. The network 200 may comprise a computing network such as a cloud-computing network. The computer system 10 may have a connection to an external computer system via the network 200. The computer system 10 may receive data to be processed, such as communication data to build up the connection between the external computer system and the computer system 10 and the PDF-document 1, from the network 200. Furthermore, the computer system 10 may provide a computing result, such as the structure 1000 or the further structure 2000, to another computing device connected to the computer system 10 via the network 200, such as the external computer system.

The computer system 10 may perform operations described herein, entirely or in part, in response to the request 1 received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory, using the network 200.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating a structure of a PDF-document, wherein the PDF-document comprises elements and pages, the method comprising:
detecting document cells of the PDF-document dependent on commands of a page description language for printing the elements of the PDF-document, wherein the PDF-document comprises the commands, wherein the detecting of the document cells includes detecting a respective position of a respective document cell;
determining parts of the PDF-document dependent on the PDF-document by a machine learning module (ML module), wherein the determining of the parts includes determining a respective position of a respective part on the pages, wherein the respective part is represented by a respective box on the pages, the determining of the respective part of the parts comprising associating a respective portion of the elements of the PDF-document that is covered by the respective box with the respective part;
assigning a respective label to the respective part;
using a symbolic artificial intelligence module (AI module), wherein the using of the symbolic AI module comprises applying rules of the symbolic AI module for reconciling the document cells with the parts, wherein the applying of the rules includes reconciling the respective position of the respective document cell with the respective position of the respective part; and
generating and labelling elements of the structure of the PDF-document dependent on a result of the reconciling and dependent on the respective label to the respective part.

2. The method of claim 1, the determining of the parts comprising recognizing the parts dependent on visualization data for displaying the PDF-document by the ML module.

3. The method of claim 1, wherein the detecting of the document cells of the PDF-document dependent on the commands comprises detecting a respective size of a respective document cell, wherein the determining of the parts comprises determining a respective size of the respective part, and the using of the symbolic AI module comprises applying rules for reconciling the respective size of the respective document cell with the respective size of the respective part.

4. The method of claim 1, the method further comprising determining further parts of the PDF-document dependent on the document cells; and
assigning a respective label to a respective further part of the further parts;
wherein the using of the symbolic AI module comprises applying rules for reconciling the respective label of the respective part with the respective label of the respective further part.

5. The method of claim 4, the method further comprising determining features of the commands of the page description language dependent on the PDF-document, the assigning of the respective label of the respective further part comprising assigning the respective label of the respective further part dependent on the features of the commands.

6. The method of claim 5, the method further comprising generating sequences dependent on the features of the commands, wherein the assigning of the respective label of the respective further part comprises assigning the respective label of the respective further part dependent on the sequences of the commands.

7. The method of claim 6, the method further comprising assigning the respective label of the respective further part using a transformer based module.

8. The method of claim 4, wherein the determining of the further parts comprises determining the further parts dependent on a result of the reconciling of the document cells with the parts.

9. The method of claim 1, wherein the method further comprises generating the rules for reconciling the document cells with the parts dependent on a training data set and provisional rules, the training data set comprising training labels and training PDF-documents with elements, wherein respective elements of the training PDF-documents are each associated with one of the training labels, wherein the generating of the rules comprises:
performing repetitions of the steps of the method of claim 1 using a respective one of the training PDF-documents and the provisional rules resulting in labels of the respective elements of a structure of the respective training PDF-document;
performing a respective comparison between the labels of the respective elements of the structure of the respective training PDF-document and the training labels of the respective elements of the respective training PDF-document in each repetition;
modifying the provisional rules dependent on a result of the comparisons; and
defining the rules for the reconciling as the modified provisional rules.

10. The method of claim 9, wherein the method further comprises performing a statistical analysis of a performance of the provisional rules dependent on a result of the performing of the repetitions of the steps of the method of claim 1, wherein the generating of the rules comprises generating the rules dependent on the statistical analysis.

11. The method of claim 1, wherein the detecting of the document cells comprises parsing the commands of the page description language.

12. The method of claim 1, wherein the detecting of the document cells comprises detecting the document cells by optical character recognition.

13. The method of claim 3, wherein the reconciling of the respective size of the respective document cell with the respective size of the respective part comprises performing a modification of the respective size of the respective part and reassociating at least one element of the respective portion of the elements of the PDF-document which is associated with the respective size of the respective part dependent on the modification.

14. The method of claim 1, wherein the reconciling of the respective position of the respective document cell with the respective position of the respective part comprises detecting an element of the PDF-document which is not associated with any part of the parts, the method further comprising assigning a label to the element which is not associated with any part.

15. The method of claim 14, the method further comprising determining sequences of the commands of the page description language dependent on the PDF-document, wherein the assigning of the label to the element which is not associated with any part comprises assigning the label dependent on the sequences of the commands.

16. The method of claim 1, wherein the detecting of the document cells comprises determining an order of the document cells, wherein the method further comprises performing the reconciling of the document cells with the parts dependent on the order of the document cells.

17. The method of claim 1, wherein the respective part is selected from a group consisting of a respective cluster of text elements, a respective cluster of image elements, a respective text paragraph, a respective text heading, a respective heading line, a respective caption, and a respective footer.

18. A computer program product for generating a structure of a PDF-document, wherein the PDF-document comprises elements and pages, the computer program product comprising one or more computer-readable storage media, and program instructions collectively stored on the one or more computer-readable storage media, the program instructions comprising:

instructions for detecting document cells of the PDF-document dependent on commands of a page description language for printing the elements of the PDF-document, wherein the PDF-document comprises the commands, wherein the detecting of the document cells includes detecting a respective position of a respective document cell;

instructions for determining parts of the PDF-document dependent on the PDF-document by a machine learning module (ML module), wherein the determining of the parts includes determining a respective position of a respective part on the pages, wherein the respective part is represented by a respective box on the pages, the determining of the respective part of the parts comprising associating a respective portion of the elements of the PDF-document that is covered by the respective box with the respective part;

instructions for assigning a respective label to the respective part;

instructions for using a symbolic artificial intelligence module (AI module), wherein the using of the symbolic AI module comprises applying rules of the symbolic AI module for reconciling the document cells with the parts, wherein the applying of the rules includes reconciling the respective position of the respective document cell with the respective position of the respective part; and instructions for generating and labelling elements of the structure of the PDF-document dependent on a result of the reconciling and dependent on the respective label to the respective part.

19. A computer system for generating a structure of a PDF-document, wherein the PDF-document comprises elements and pages, the computer system being configured for:

detecting document cells of the PDF-document dependent on commands of a page description language for printing the elements of the PDF-document, wherein the PDF-document comprises the commands, wherein the detecting of the document cells includes detecting a respective position of a respective document cell;

determining parts of the PDF-document dependent on the PDF-document by a machine learning module (ML module), wherein the determining of the parts includes determining a respective position of a respective part on the pages, wherein the respective part is represented by a respective box on the pages, the determining of the respective part of the parts comprising associating a respective portion of the elements of the PDF-document that is covered by the respective box with the respective part;

assigning a respective label to the respective part;

using a symbolic artificial intelligence module (AI module), wherein the using of the symbolic AI module comprises applying rules of the symbolic AI module for reconciling the document cells with the parts, wherein the applying of the rules includes reconciling the respective position of the respective document cell with the respective position of the respective part; and generating and labelling elements of the structure of the PDF-document dependent on a result of the reconciling and dependent on the respective label to the respective part.

* * * * *